(12) United States Patent
Song

(10) Patent No.: US 8,107,047 B2
(45) Date of Patent: Jan. 31, 2012

(54) LIQUID CRYSTAL DISPLAY APPARATUS

(75) Inventor: Jang-Kun Song, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 10/719,103

(22) Filed: Nov. 21, 2003

(65) Prior Publication Data
US 2004/0252271 A1 Dec. 16, 2004

(30) Foreign Application Priority Data

Jun. 12, 2003 (KR) .................... 10-2003-0037835

(51) Int. Cl.
*G02F 1/1339* (2006.01)
*G02F 1/1335* (2006.01)
*G02F 1/1333* (2006.01)
*G02F 1/1337* (2006.01)

(52) U.S. Cl. ......... 349/155; 349/106; 349/110; 349/129

(58) Field of Classification Search .................... 349/42, 349/43, 110, 106, 155, 156, 157, 129
See application file for complete search history.

(56) References Cited

U.S. PATENT DOCUMENTS

| | | | | |
|---|---|---|---|---|
| 5,757,451 A | * | 5/1998 | Miyazaki et al. | 349/106 |
| 5,801,797 A | * | 9/1998 | Iida et al. | 349/73 |
| 5,969,784 A | * | 10/1999 | Miyazaki et al. | 349/155 |
| 6,140,988 A | * | 10/2000 | Yamada | 345/88 |
| 6,317,187 B1 | * | 11/2001 | Nakajima et al. | 349/155 |
| 6,323,921 B1 | * | 11/2001 | Kurauchi et al. | 349/106 |
| 6,836,308 B2 | * | 12/2004 | Sawasaki et al. | 349/129 |
| 2001/0040656 A1 | * | 11/2001 | Na et al. | 349/110 |
| 2003/0156237 A1 | * | 8/2003 | Lin et al. | 349/110 |
| 2004/0041963 A1 | * | 3/2004 | Ogishima et al. | 349/110 |

FOREIGN PATENT DOCUMENTS

| | | |
|---|---|---|
| JP | 2002-055350 | 2/2002 |
| JP | 2002-214614 | 7/2002 |
| KR | 10-2002-0071542 A | 9/2002 |

* cited by examiner

*Primary Examiner* — Nathanael R Briggs
(74) *Attorney, Agent, or Firm* — Innovation Counsel LLP

(57) ABSTRACT

A liquid crystal display (LCD) apparatus includes a first panel, a second panel, and a liquid crystal layer disposed between the first and second panels. The first panel includes a first transparent substrate having a pixel area, a thin film transistor disposed at the pixel area so as to output a pixel voltage, a first color filter disposed at the pixel area, the first color filter having a first edge, a second color filter disposed adjacent to the first color filter and having a second edge, the first edge and the second edge being overlapped to provide an overlapped area between the first color filter and the second color filter, a spacer disposed on the overlapped area between the first color filter and the adjacent second color filter, and a pixel electrode disposed on the first color filter so as to receive the pixel voltage. The spacer has a same material as one of the first color filter and the second color filter. The second panel includes a second transparent substrate and a common electrode disposed on the second transparent substrate.

14 Claims, 25 Drawing Sheets

FIG. 2
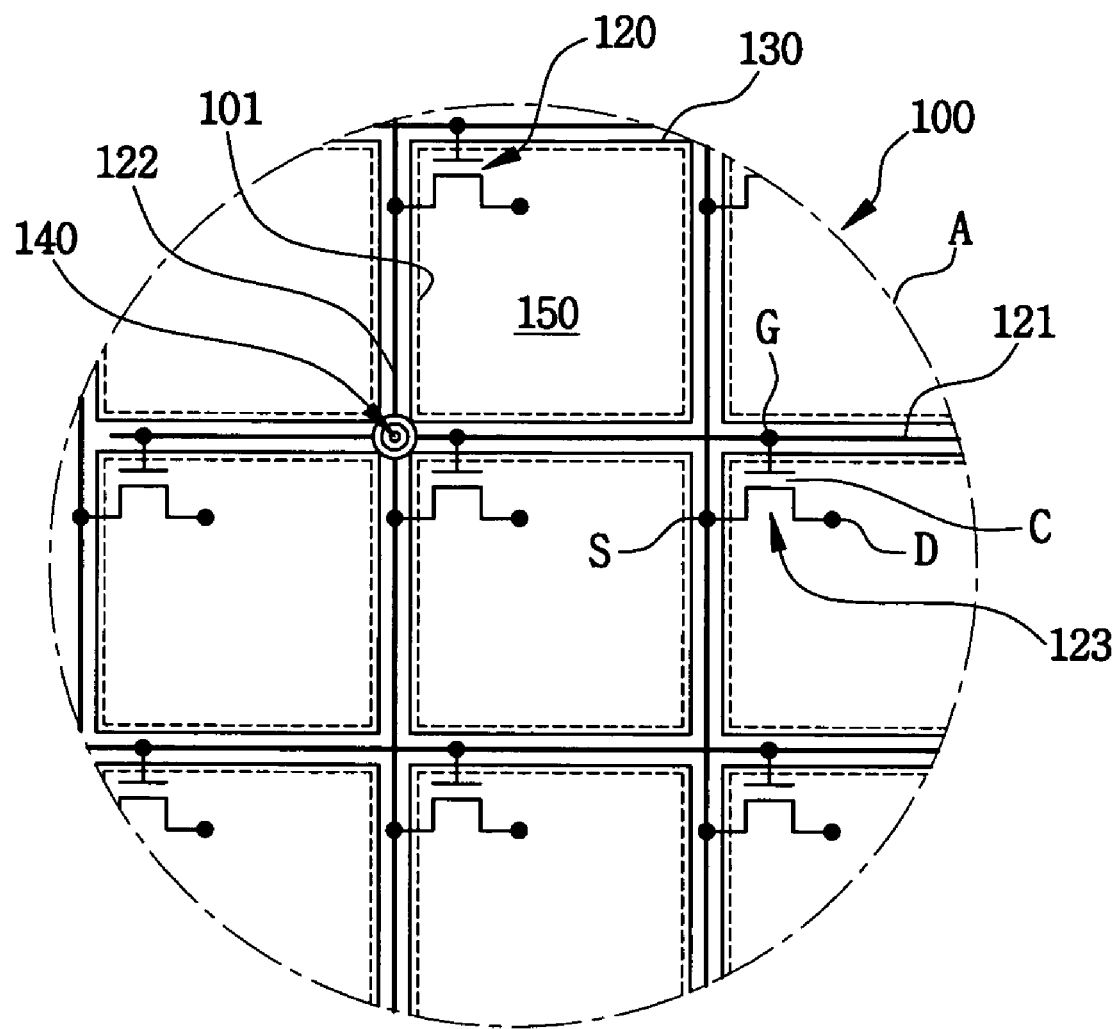
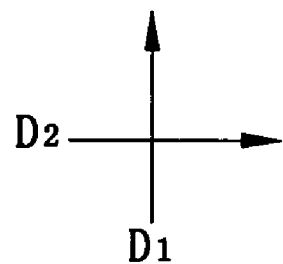

LIQUID CRYSTAL DISPLAY APPARATUS

CROSS-REFERENCE TO RELATED APPLICATION

This application relies for priority upon Korean Patent Application No. 2003-37835 filed on Jun. 12, 2003, the contents of which are herein incorporated by reference in its entirety.

BACKGROUND OF THE INVENTION

1. Field of the Invention

The present invention relates to a liquid crystal display apparatus (LCD) and a method of manufacturing the same, and more particularly to an LCD apparatus having a high display quality and a method of manufacturing the same through simplified and reduced process.

2. Description of the Related Art

An LCD apparatus, generally, displays an image using liquid crystal. In order to display an image, an LCD apparatus includes an LCD panel and a backlight assembly for providing light to the LCD panel. The LCD panel includes a first substrate, a second substrate facing the first substrate and liquid crystal interposed between the first and second substrates.

The first substrate includes a plurality of first electrodes, and the second substrate includes a second electrode facing the first electrodes. Each of the first electrodes receives a different pixel voltage from each other and the second electrode receives a common voltage having a substantially uniform level. The liquid crystal has a light transmittance varied in accordance with an intensity of an electric filed applied between the first and second electrodes. That is, the LCD apparatus may display an image by adjusting the light transmittance of the liquid crystal.

In general, a display quality of the LCD apparatus is greatly affected by a cell gap between the first and second substrates. In order to uniformly maintain the cell gap between the first and second substrates, the LCD panel includes a spacer, for example, such as a ball spacer having a spherical shape, a column spacer and so on, disposed between the first and second substrates.

The ball spacer comprising isopropyl alcohol is formed on the first or second substrates through a dispersal process, and the column spacer is also formed on the first or second substrates through a patterning process of a photoresist layer. The first substrate is combined with the second substrate after forming the ball or column spacers.

However, a conventional LCD apparatus needs a lot of processes so as to form the ball or column spacers. As a result, a manufacturing cost of the LCD apparatus may increase.

BRIEF SUMMARY OF THE INVENTION

The present invention provides an LCD apparatus having a high display quality.

The present invention provides a method suitable for manufacturing the above LCD apparatus through simplified and reduced process.

In one aspect of the invention, a liquid crystal display apparatus includes a first panel, a second panel and a liquid crystal layer disposed between the first and second panels.

The first panel includes a first transparent substrate having a pixel area, a thin film transistor disposed at the pixel area so as to output a pixel voltage, a first color filter disposed at the pixel area, the first color filter having a first edge, a second color filter disposed adjacent to the first color filter and having a second edge, the first edge and the second edge being overlapped to provide an overlapped area between the first color filter and the second color filter, a spacer disposed on the overlapped area between the first color filter and the adjacent second color filter, the spacer having a same material as one of the first color filter and the second color filter, and a pixel electrode disposed on the color filter so as to receive the pixel voltage.

The second panel includes a second transparent substrate and a common electrode disposed on the second transparent substrate.

In another aspect of the invention, a manufacturing method of a liquid crystal display apparatus includes forming a first substrate, forming a second substrate and disposing liquid crystal between the first and second substrates.

The forming of the first substrate includes forming a pixel voltage applying part so as to output a pixel voltage to each pixel area of a first transparent substrate, forming a color filter and a color filter spacer having a same material as the color filter, the color filter corresponding to the pixel area and the color filter spacer being formed at a position corresponding to a space between the pixel area and an adjacent pixel area, and forming a pixel electrode on the color filter to form a first substrate, the pixel electrode receiving the pixel voltage.

The forming of the second substrate includes forming a common electrode, which is facing the pixel electrode, on a second transparent substrate, the second transparent substrate combining with the first transparent substrate.

According to the LCD apparatus and manufacturing method of the LCD apparatus, the first substrate on which the pixel electrode and color filter are formed includes the color filter spacer. The second substrate on which the common electrode is formed includes the light blocking pattern formed at the position between the pixel areas and the light visual angle pattern formed at the position corresponding to the pixel areas. Thus, the LCD apparatus may be manufactured through simplified and reduced processes and improve display quality of an image.

BRIEF DESCRIPTION OF THE DRAWINGS

The above and other advantages of the present invention will become readily apparent by reference to the following detailed description when considered in conjunction with the accompanying drawings wherein:

FIG. 2 is an enlarged view showing a portion "A" of FIG. 1;

DETAILED DESCRIPTION OF THE INVENTION

Embodiments of an LCD Apparatus

Embodiment 1

Figure 1:
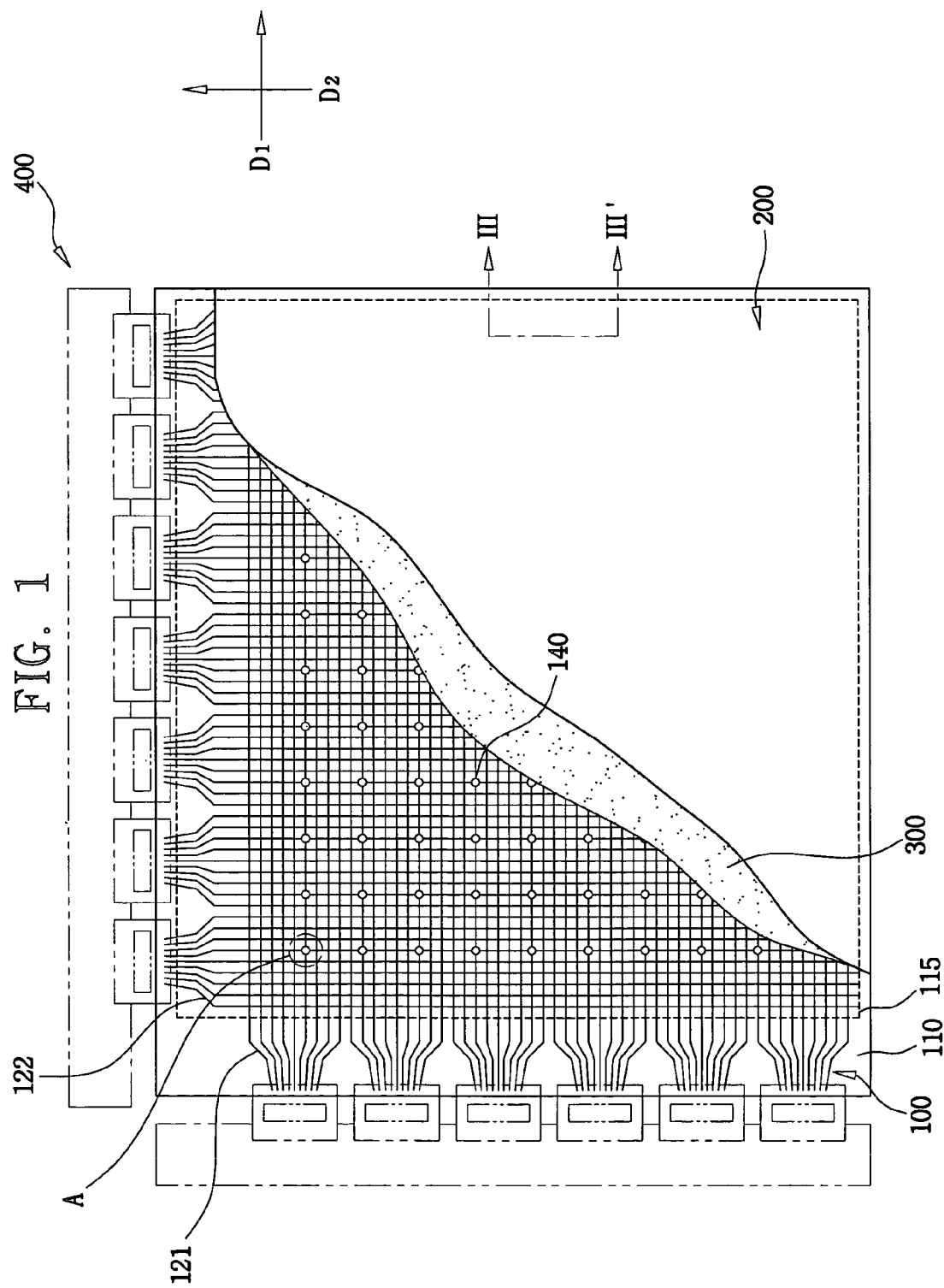
FIG. 1 is a schematic view showing an LCD apparatus according to a first exemplary embodiment of the present invention.
Figure 3:
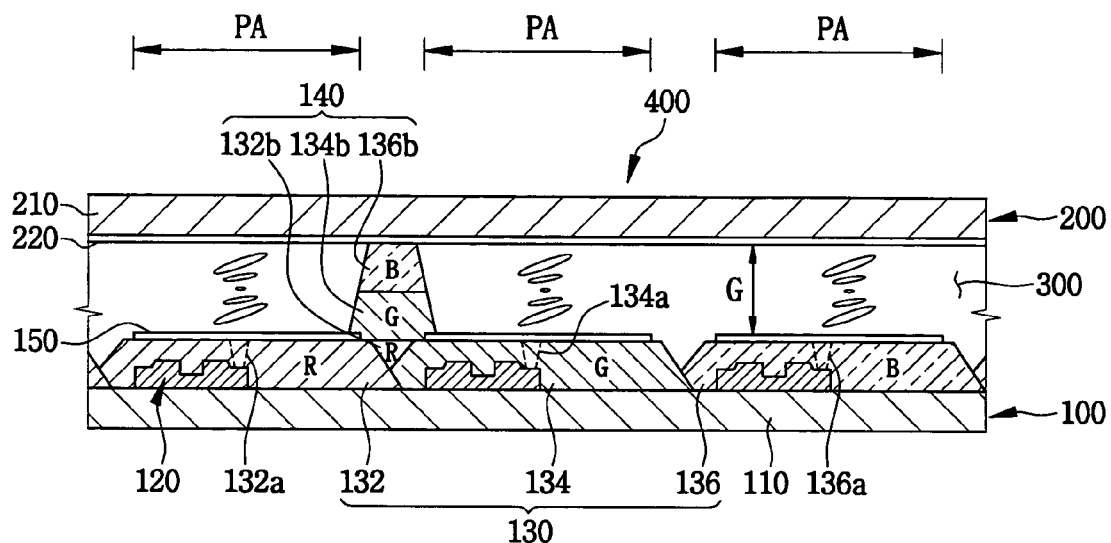
FIG. 3 is a cross-sectional view taken along the line III-III' showing the LCD apparatus shown in FIG. 3.

FIG. 1 is a schematic view showing an LCD apparatus according to a first exemplary embodiment of the present invention. FIG. 2 is an enlarged view showing a portion "A" of FIG. 1. FIG. 3 is a cross-sectional view taken along the line III-III' showing the LCD apparatus shown in FIG. 3.

Referring to FIGS. 1 to 3, an LCD apparatus 400 includes a first substrate or panel 100, a second substrate or panel 200 and liquid crystal layer 300.

The first substrate or panel 100 includes a first transparent substrate 110, a driving voltage-applying device 120, a color filter 130, a color filter spacer 140 and a pixel electrode 150.

The first transparent substrate 110 comprises a glass substrate having a high light transmittance and a plurality of pixel areas 101 (refer to FIG. 2). In case that the LCD apparatus has a resolution of 1024×768, the first transparent substrate 110 includes the pixel areas of 1024×768×3 units. The light passing through the pixel areas is exited in mosaic, and thus user may recognize the image.

The driving voltage applying device 120 disposed at each pixel areas 101 includes a gate bus line 121, a data bus line 122 and a thin film transistor (TFT) 123.

The gate bus line 121 is extended in a first direction D1 and the data bus line 122 is extended in a second direction D2 substantially perpendicular to the first direction D1. When the resolution of the LCD apparatus 400 is 1024×768, the gate bus line 121 of 768 units is formed on the first transparent substrate 110 and the data bus line 122 of 1024×3 units is formed on the first transparent substrate 110.

The TFT 123 is formed at each pixel areas 101 of the first transparent substrate 110. Particularly, the TFT 123 is disposed at a position where the gate and data bus lines 121 and 122 are intersected with each other. The TFT 123 includes a gate electrode portion G, a channel layer C, a source electrode portion S and a drain electrode portion D. The gate electrode portion G is extended from the gate bus line 121 in the second direction D2. The channel layer C is insulated from the gate electrode portion G and disposed on the gate electrode portion G. The channel layer C includes an amorphous silicon film and an n$^+$ amorphous silicon film disposed on the amorphous silicon film. The n+ amorphous silicon film disposed on the amorphous silicon film is divided into two portions. The source electrode portion S is extended from the data bus line 122 to the pixel areas 101. The source electrode portion S makes contact with one of two portions of the n+ amorphous silicon film, and the drain electrode portion D makes contact with a remained one of two portion of the n+ amorphous silicon film.

As shown in FIG. 3, the color filter 130 is disposed at each pixel areas 101. The edge of the color filter 130 is overlapped with an edge of an adjacent color filter 130 at a position between the pixel areas 101. The overlapped area of the color filter 130 blocks light leaked through between the pixel areas 101. Thus, the LCD apparatus 400 does not need a light blocking pattern, for example, such as a black matrix pattern, for blocking the light leaked through between the pixel areas 101.

The color filter 130 includes a red (R) color filter 132, a green (G) color filter 134 and a blue (B) color filter 136. The R color filter 132 includes an R color filter material that transmits an R wavelength, the G color filter 134 includes a G color filter material that transmits a G wavelength, and the B color filter material that transmits a B wavelength. In the pixel areas 101, an $N^{th}$ pixel area includes the R color filter 132, an $N+1^{st}$ pixel area includes the G color filter 134, and $N+2^{nd}$ pixel area includes a B color filter 136. The color filter 130 covers the TFT 123. The R, G and B color filters 132, 134 and 136 include contact holes 132a, 134a and 136a so as to partially expose the drain electrode portion D.

The color filter spacer 140 is disposed between the pixel areas 101 formed on the first transparent substrate 110, and comprises a same material as the color filter 130. The color filter spacer 140 includes an R color filter spacer 132b, a G color filter spacer 134b and a B color filter spacer 136b. The R, G and B color filter spacers 132b, 134b and 146b comprise an R color filter material, a G color filter material and a B color filter material, respectively. At least one of the R, G and B color filter spacers 132b, 134b and 136b has a column shape. The color filter spacer 140 having the column shape is disposed between the first and second substrates 100 and 200 so as to maintain the cell gap between the first and second substrates 100 and 200. In order to uniformly maintain the cell gap, the color filter spacer 140 may be formed at each pixel areas 101.

The pixel electrode 150 is formed at the pixel areas 101, and disposed on the color filter 130. The pixel electrode 150 includes a transparent and conductive material, for example, such as indium tin oxide (ITO), indium zinc oxide (IZO) or the like. The pixel electrode 150 is electrically connected to the drain electrode portion D of a corresponding TFT 123 through the contact holes 132a, 134a and 136a. Also, the pixel electrode 150 receives a driving voltage from the TFT 123.

Referring to FIG. 3, the second substrate or panel 200 includes a second transparent substrate 210 and a common electrode 220. The common electrode 220 is formed over the second transparent substrate 210, which comprises the ITO or IZO.

The first substrate 100 is assembled with the second substrate 200 such that the pixel electrode 150 faces the common electrode 220. In order to assemble the first substrate 100 with the second substrate 200, the first and second substrates 100 and 200 include a sealing member 115 (refer to FIG. 1). The sealing member 115 has a band shape, and is formed on edges of the first and second substrates 100 and 200.

The liquid crystal 300 is disposed between the first and second substrates 100 and 200. The liquid crystal 300 varies an arrangement thereof in accordance with an electric field between the pixel and common electrodes 150 and 220.

In this exemplary embodiment, the LCD apparatus 400 may further include a backlight assembly (not shown) disposed adjacent to the first substrate 100 so as to supply the light to the liquid crystal 300. Also, the LCD apparatus 400 may further include an optical sheet, for example, such as a diffusion sheet, a prism sheet, etc., disposed between the first substrate 100 and backlight assembly so as to improve optical properties of the light provided from the backlight assembly.

In this exemplary embodiment, the first transparent substrate 110 includes the TFT 123 disposed at each pixel areas 101, color filter 130 formed over the TFT 123, pixel electrode 150 formed on the color filter 130, and color filter spacer 140 comprising same material as the color filter 130. Since the color filter spacer 140 is substantially and simultaneously formed with the color filter 130, the LCD apparatus 400 does not need separate processes for forming the color filter spacer 140. Thus, the LCD apparatus 400 may be manufactured through simplified and reduced process.

Embodiment 2

Figure 4:
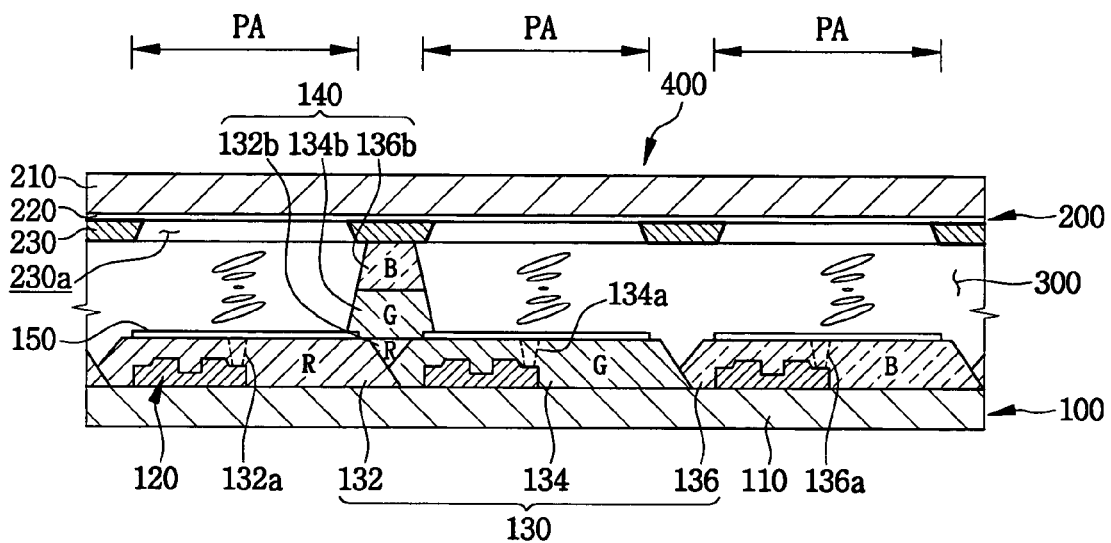
FIG. 4 is a cross-sectional view showing an LCD apparatus according to a second exemplary embodiment of the present invention.

FIG. 4 is a cross-sectional view showing an LCD apparatus according to a second exemplary embodiment of the present invention. In FIG. 4, the same reference numerals denote the same elements in FIGS. 1 to 3, and thus the detailed descriptions of the same elements will be omitted.

Referring to FIG. 4, a second substrate 200 further includes a light blocking pattern 230 formed on a common electrode 220. The light blocking pattern 230 is formed by patterning a light blocking layer that comprises an organic material having a light transmittance or a light blocking rate substantially equal to that of a chromium Cr. The light blocking layer may comprise a black-colored organic material having the light transmittance or the light blocking rate substantially equal to that of a chromium Cr. The light blocking pattern 230 having a lattice-shape transmits the light incident through an opening 230a corresponding to the pixel areas 101 and blocks the light incident through between the pixel areas 101, thereby improving a display quality. The light blocking pattern 230 has a lower surface making contact with an upper surface of the color filter spacer 140.

A liquid crystal having liquid crystal molecules vertically aligned or a twist nematic liquid crystal may be disposed between the first and second substrates 100 and 200. In this exemplary embodiment, the twist nematic liquid crystal is disposed between the first and second substrates 100 and 200.

According to this exemplary embodiment, the light blocking pattern 230 formed on the common electrode 220 makes contact with the upper surface of the color filter spacer 140 to block the light leaked through between the pixel areas 101. Thus, the LCD apparatus 400 may be manufactured through simplified and reduced process.

Embodiment 3

Figure 5:
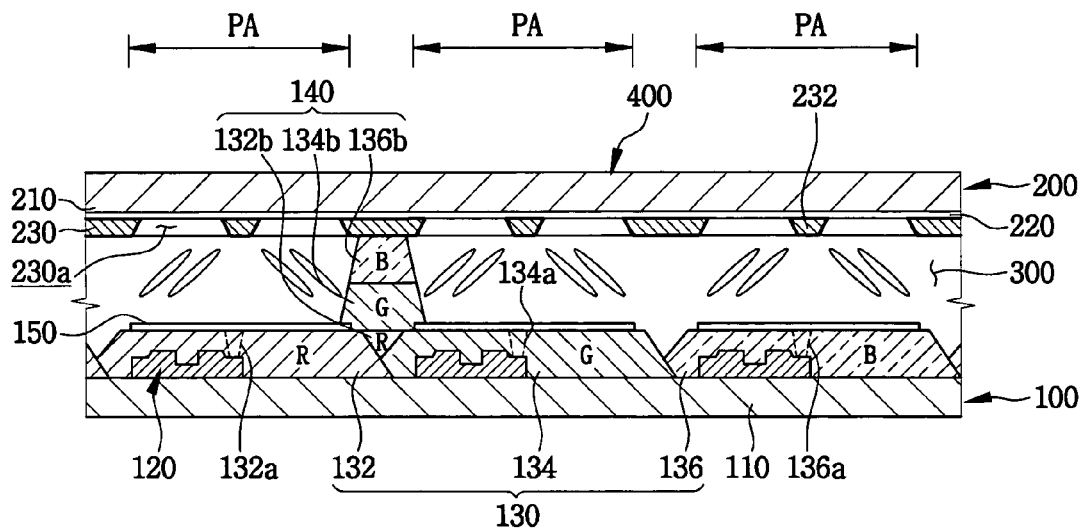
FIG. 5 is a cross-sectional view showing an LCD apparatus according to a third exemplary embodiment of the present invention.
Figure 6:
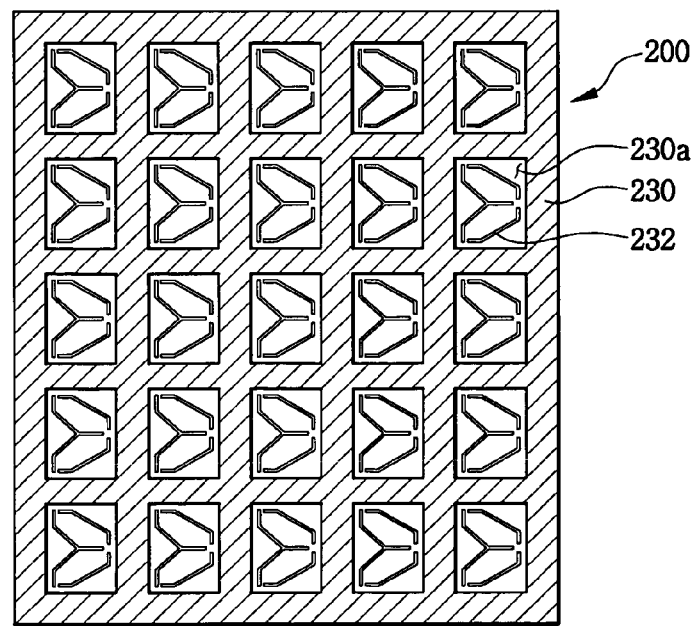
FIG. 6 is a plan view showing a common electrode shown in FIG. 5.

FIG. 5 is a cross-sectional view showing an LCD apparatus according to a third exemplary embodiment of the present invention. FIG. 6 is a plan view showing a common electrode shown in FIG. 5. In FIGS. 5 and 6, the same reference numerals denote the same elements in FIG. 4, and thus the detailed descriptions of the same elements will be omitted.

Referring to FIGS. 5 and 6, a second substrate 200 further includes a light blocking pattern 230 formed on a common electrode 220 and a light visual angle pattern 232.

The light blocking pattern 230 is formed by patterning a light blocking layer that comprises an organic material having a light transmittance or a light blocking rate substantially equal to that of a chromium Cr. The light blocking pattern 230 has an opening 230a corresponding to pixel areas 101. The light blocking pattern 230 having a lattice-shape transmits the light incident into the pixel areas 101, and blocks the light incident through between the pixel areas 101. The light blocking pattern 230 has a lower surface making contact with an upper surface of the color filter spacer 140.

The light visual angle pattern 232 is formed on the common electrode 220 and disposed between the light blocking pattern 230 and an adjacent light blocking pattern 230. The light visual angle pattern 232 has a band shape, and varies arrangement of liquid crystal 300, thereby widening a visual angle of an image.

In order to widen the visual angle of the image using the light visual angle pattern 232, a liquid crystal having liquid crystal molecules vertically aligned may be disposed between the first and second substrates 100 and 200.

In this exemplary embodiment, the light blocking layer is patterned to substantially and simultaneously form the light blocking pattern 220 that blocks the light leaked through between the pixel areas 101 and the light visual angle pattern 232. Thus, the LCD apparatus 400 may have an improved display quality by widening the visual angle of the image. Also, the LCD apparatus 400 also may be manufactured through simplified and reduced process.

Embodiment 4

Figure 7:
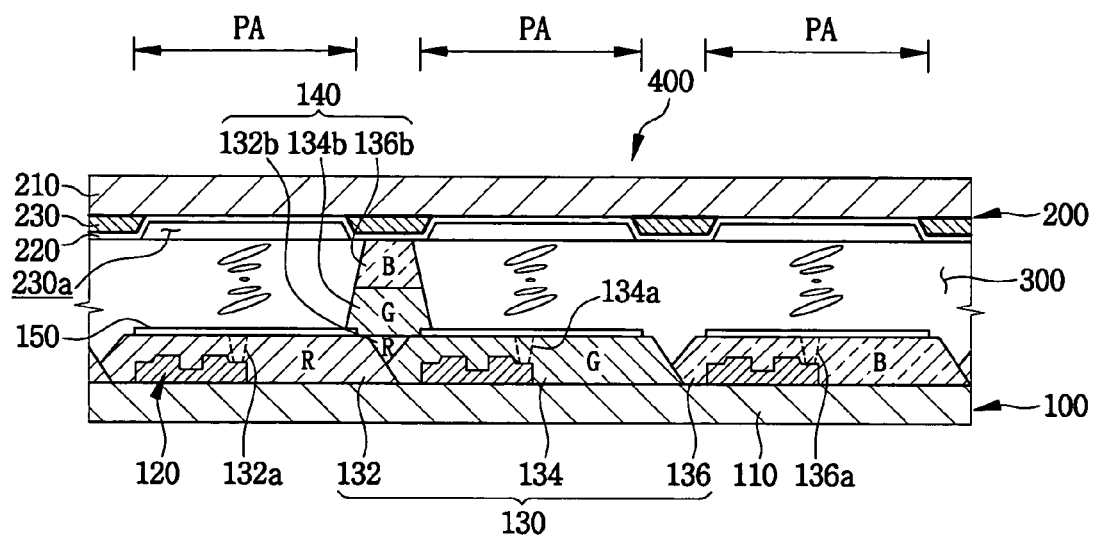
FIG. 7 is a cross-sectional view showing an LCD apparatus according to a fourth exemplary embodiment of the present invention.

FIG. 7 is a cross-sectional view showing an LCD apparatus according to a fourth exemplary embodiment of the present invention. In FIG. 7, the same reference numerals denote the same elements in FIG. 4, and thus the detailed descriptions of the same elements will be omitted.

Referring to FIG. 7, a light blocking layer having a light transmittance or a light blocking rate substantially equal to that of a chromium Cr is formed on a second transparent substrate 210 of a second substrate 200. The light blocking layer is patterned to form a light blocking pattern 230 having an opening 230a on the second transparent substrate 210, which is corresponding to pixel areas 101.

A common electrode 220 comprising ITO or IZO is formed over the second transparent substrate 210 on which the light blocking pattern 230 is formed. The common electrode 220 directly makes contact with a color spacer 140 formed on a first substrate 100.

The common electrode 220 reinforces the light blocking pattern 230 comprising an organic material, thereby preventing the light blocking pattern 230 from being damaged due to an impact externally provided. Thus, a cell gap between the first and second substrates 100 and 200 may be uniformly maintained.

In this exemplary embodiment, the light blocking pattern 230 and common electrode 220 are successively formed on the second transparent substrate 210. Thus, an LCD apparatus 400 may block the light leaked through between the pixel areas 101, so that the LCD apparatus 400 may be manufactured through simplified and reduced process. The LCD apparatus 400 may also prevent the light blocking pattern 230 from being damaged due to an impact externally provided using the common electrode 220, thereby improving a display quality thereof.

Embodiment 5

Figure 8:
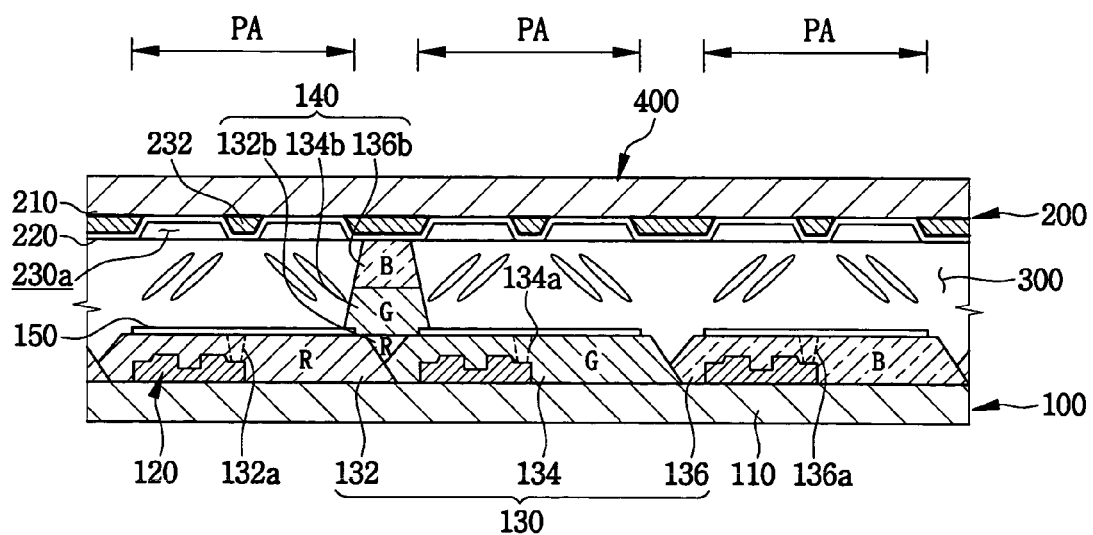
FIG. 8 is a cross-sectional view showing an LCD apparatus according to a fifth exemplary embodiment of the present invention.

FIG. 8 is a cross-sectional view showing an LCD apparatus according to a fifth exemplary embodiment of the present invention. In FIG. 8, the same reference numerals denote the same elements in FIG. 7, and thus the detailed descriptions of the same elements will be omitted.

Referring to FIG. 8, a second substrate 200 includes a light blocking pattern 230 and a light visual angle pattern 232 formed on a second transparent substrate 210. The light blocking pattern 230 and light visual angle pattern 232 are disposed between the second transparent substrate 210 and a common electrode 220.

The light blocking pattern 230 is formed by patterning a light blocking layer that comprises an organic material having a light transmittance or a light blocking rate substantially equal to that of a chromium Cr. The light blocking pattern 230 has an opening 230a corresponding to pixel areas 101. The light blocking pattern 230 having a lattice-shape transmits the light incident into the pixel areas 101 and blocks the light incident through between the pixel areas 101.

The light visual angle pattern 232 is formed between the second transparent substrate 210 and common electrode 220, and disposed between the light blocking pattern 230 and an adjacent light blocking pattern 230. The light visual angle pattern 232 having a line shape is simultaneously formed with the light blocking pattern 230 by patterning the light blocking layer.

In order to widen a visual angle of an image using the light visual angle pattern 232, a liquid crystal having liquid crystal molecules vertically aligned may be disposed between the first and second substrates 100 and 200.

The common electrode 220 is formed on the second transparent substrate 210 such that the light blocking pattern 230 and light visual angle pattern 232 are covered by means of the common electrode 220. Thus, the common electrode 220 makes contact with an upper surface of a color filter spacer 140 formed on the first substrate 100.

In this exemplary embodiment, the light blocking layer is patterned to substantially and simultaneously form the light blocking pattern 220 and light visual angle pattern 232. Thus, the LCD apparatus 400 also may be manufactured through simplified and reduced process. The LCD apparatus 400 may also prevent the light blocking pattern 230 from being damaged due to an impact externally provided using the common electrode 220, thereby improving a display quality thereof.

Embodiment 6

Figure 9:
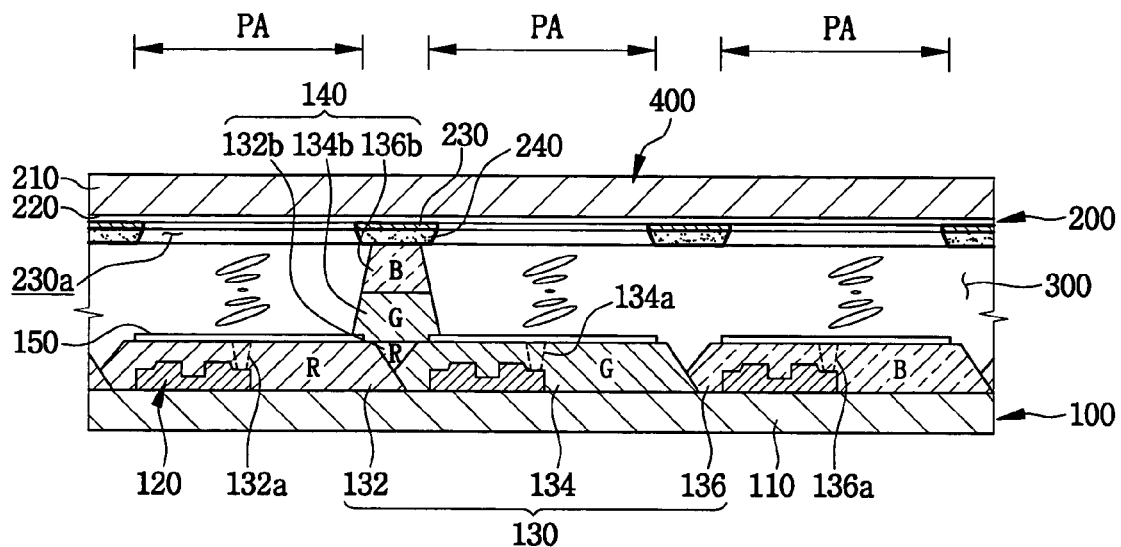
FIG. 9 is a cross-sectional view showing an LCD apparatus according to a sixth exemplary embodiment of the present invention.

FIG. 9 is a cross-sectional view showing an LCD apparatus according to a sixth exemplary embodiment of the present invention. In FIG. 9, the same reference numerals denote the same elements in FIG. 4, and thus the detailed descriptions of the same elements will be omitted.

Referring to FIG. 9, a light blocking layer comprising chromium Cr or a double-layer light blocking layer comprising chromium Cr and chromium oxide $CrO_2$ is formed on a common electrode 220 of a second substrate 200. In this exemplary embodiment, the light blocking layer comprises the chromium Cr. The light blocking layer comprising the chromium Cr or a double-layer light blocking layer comprising chromium Cr and chromium oxide $CrO_2$ has a thickness thinner than and a strength stronger than those of a light blocking layer comprising an organic material.

A photosensitive layer comprising a photosensitive material is formed over the light blocking layer. The photosensitive layer is patterned to form a photosensitive pattern 240 on the light blocking layer.

When the light blocking layer is patterned using the photosensitive pattern 240 as a mask, a light blocking pattern 230 is formed at a position between pixel areas 101, so that the light blocking pattern 230 and photosensitive pattern 240 are formed on the common electrode 220. The photosensitive pattern 240 makes contact with an upper surface of a color filter spacer 140 formed on a first substrate 100.

In this exemplary embodiment, the light blocking pattern 230 and photosensitive pattern 240 are successively formed on the common electrode 220, and disposed between the pixel areas 101. When the color filter spacer 140 has a height lower than that of a cell gap between the first and second substrates 100 and 200, the light blocking pattern 230 and photosensitive pattern 240 may uniformly maintain the cell gap between the first and second substrates 100 and 200 with the color filter spacer 140, thereby preventing variation of the cell gap of an LCD apparatus 400.

Embodiment 7

Figure 10:
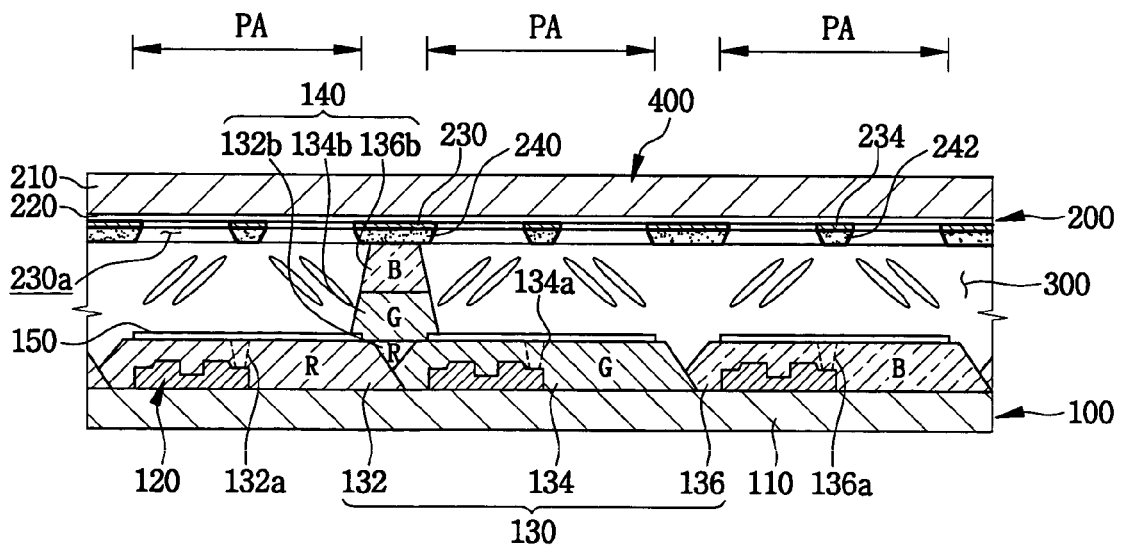
FIG. 10 is a cross-sectional view showing an LCD apparatus according to a seventh exemplary embodiment of the present invention.

FIG. 10 is a cross-sectional view showing an LCD apparatus according to a seventh exemplary embodiment of the present invention. In FIG. 10, the same reference numerals denote the same elements in FIG. 9, and thus the detailed descriptions of the same elements will be omitted.

Referring to FIG. 10, a light blocking layer comprising chromium Cr or a double-layer light blocking layer comprising chromium Cr and chromium oxide $CrO_2$ is formed on a common electrode 220 of a second substrate 200. In this exemplary embodiment, the light blocking layer comprises the chromium Cr.

A photosensitive layer comprising a photosensitive material is formed over the light blocking layer. The photosensitive layer is patterned to form a first light visual angle pattern 242 and a photosensitive pattern 240 on the light blocking layer. The first light visual angle pattern 242 having a line shape is formed at a position corresponding to pixel areas 101. The photosensitive pattern 240 is formed at a position between the pixel areas 101.

When the light blocking layer is patterned using the photosensitive pattern 240 and first visual angle pattern 242 as a mask, a second visual angle pattern 234 and a light blocking pattern 230 are formed under the first visual angle pattern 242 and photosensitive pattern 234, respectively. The photosensitive pattern 240 makes contact with an upper surface of a color filter spacer 140 formed on a first substrate 100. Liquid crystal having liquid crystal molecules vertically aligned is disposed between the first and second substrates 100 and 200.

In this exemplary embodiment, the light blocking pattern 230 and photosensitive pattern 240 are successively formed on the common electrode 220 corresponding to the position between the pixel areas 101. Also, the second light visual angle pattern 234 and first light visual angle pattern 242 are successively formed on the common electrode 220 corresponding to the pixel areas 101. Thus, the LCD apparatus 400 may prevent leakage of the light through between the pixel areas 101, and may widen the visual angle of the image, thereby improving a display quality.

Embodiment 8

Figure 11:
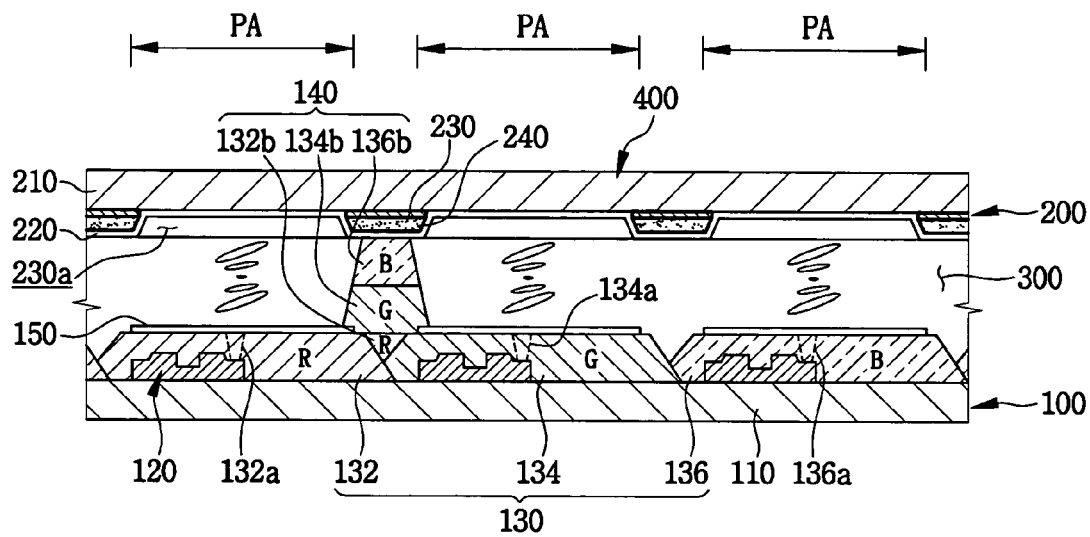
FIG. 11 is a cross-sectional view showing an LCD apparatus according to a eighth exemplary embodiment of the present invention.

FIG. 11 is a cross-sectional view showing an LCD apparatus according to an eighth exemplary embodiment of the present invention. In FIG. 11, the same reference numerals denote the same elements in FIG. 9, and thus the detailed descriptions of the same elements will be omitted.

Referring to FIG. 11, a light blocking layer comprising chromium Cr or a double-layer light blocking layer comprising chromium Cr and chromium oxide $CrO_2$ is formed on a common electrode 210 of a second substrate 200. In this exemplary embodiment, the light blocking layer comprises the chromium Cr.

A photosensitive layer comprising a photosensitive material is formed over the light blocking layer. The photosensitive layer is patterned to form a photosensitive pattern 240 on the light blocking layer.

When the light blocking layer is patterned using the photosensitive pattern 240 as a mask, a light blocking pattern 230 is formed at a position between pixel areas 101, so that the light blocking pattern 230 and photosensitive pattern 240 are formed on a second transparent substrate 210. A common electrode 220 is formed over the second transparent substrate 210 so as to allow the light blocking pattern 230 and photosensitive pattern 240 to be covered thereby. Also, the common electrode 220 makes contact with an upper surface of a color filter spacer 140 formed on a first substrate 100.

In this exemplary embodiment, the light blocking pattern 230 and photosensitive pattern 240 are successively formed on the second transparent substrate 210 and disposed between the pixel areas 101. The common electrode 220 is formed on the photosensitive pattern 240 and second transparent substrate 210. When the color filter spacer 140 has a height lower than that of a cell gap between the first and second substrates 100 and 200, the light blocking pattern 230 and photosensitive pattern 240 may uniformly maintain the cell gap between the first and second substrates 100 and 200 with the color filter spacer 140, thereby preventing variation of the cell gap of an LCD apparatus 400.

Embodiment 9

Figure 12:
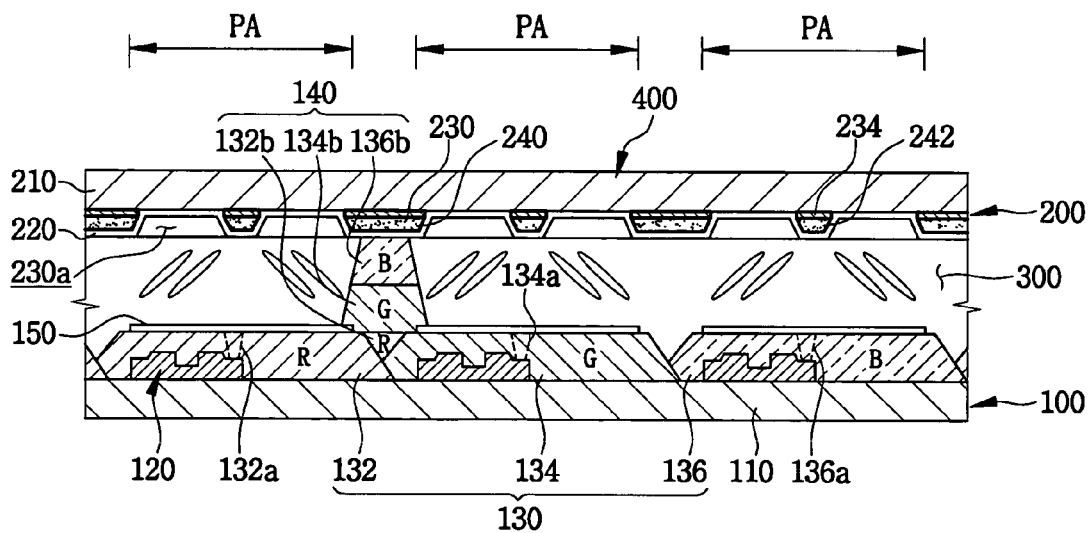
FIG. 12 is a cross-sectional view showing an LCD apparatus according to a ninth exemplary embodiment of the present invention.

FIG. 12 is a cross-sectional view showing an LCD apparatus according to a ninth exemplary embodiment of the present invention. In FIG. 12, the same reference numerals denote the same elements in FIG. 10, and thus the detailed descriptions of the same elements will be omitted.

Referring to FIG. 12, a light blocking layer comprising chromium Cr or a double-layer light blocking layer comprising chromium Cr and chromium oxide $CrO_2$ is formed on a second transparent substrate 210 of a second substrate 200. In this exemplary embodiment, the light blocking layer comprises the chromium Cr.

A photosensitive layer comprising a photosensitive material is formed over the light blocking layer. The photosensitive layer is patterned to form a first light visual angle pattern 242 and a photosensitive pattern 240 on the light blocking layer. The first light visual angle pattern 242 having a line shape is formed at a position corresponding to pixel areas 101. The photosensitive pattern 240 is formed at a position between the pixel areas 101.

When the light blocking layer is patterned using the photosensitive pattern 240 and first visual angle pattern 242 as a mask, a second visual angle pattern 234 and a light blocking pattern 230 are formed under the first visual angle pattern 242 and photosensitive pattern 234, respectively.

A common electrode 220 is formed over the second transparent substrate 210 so as to allow the light blocking pattern 230 and photosensitive pattern 240 to be covered thereby. Also, the common electrode 220 makes contact with an upper surface of a color filter spacer 140 formed on a first substrate 100.

In this exemplary embodiment, the light blocking pattern 230 and photosensitive pattern 240 are successively formed on the second transparent substrate 210 corresponding to the position between the pixel areas 101. Also, the second light visual angle pattern 234 and first light visual angle pattern 242 are successively formed on the second transparent substrate 210 corresponding to the pixel areas 101. Thus, the LCD apparatus 400 may prevent leakage of the light through between the pixel areas 101 and may widen the visual angle of the image, thereby improving a display quality.

Embodiment 10

Figure 13:
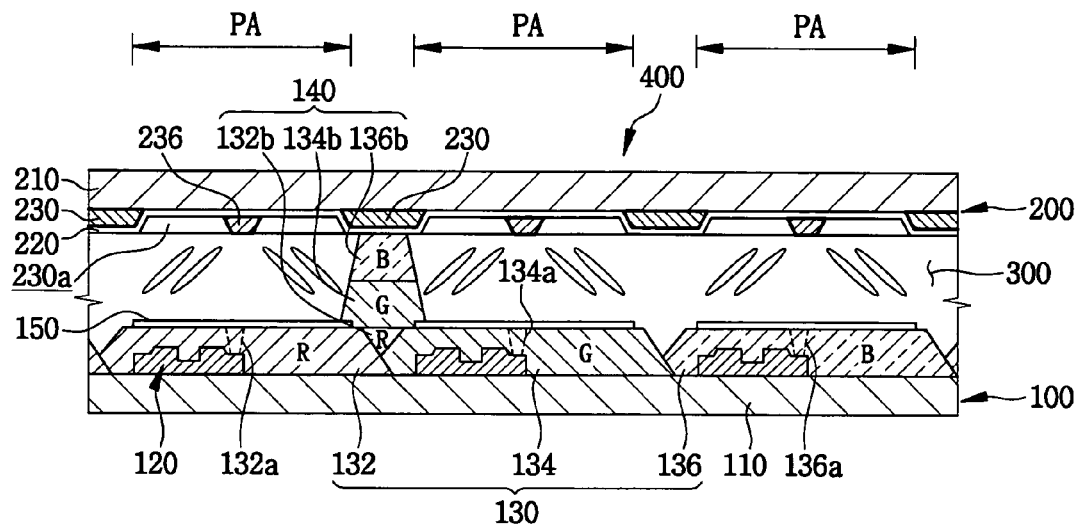
FIG. 13 is a cross-sectional view showing an LCD apparatus according to a tenth exemplary embodiment of the present invention.

FIG. 13 is a cross-sectional view showing an LCD apparatus according to a tenth exemplary embodiment of the present invention. In FIG. 13, the same reference numerals denote the same elements in FIG. 7, and thus the detailed descriptions of the same elements will be omitted.

Referring to FIG. 13, a common electrode 220 is formed over a second transparent substrate 210 such that a light blocking pattern 230 formed on the second transparent substrate 210 of a second substrate 200 is covered by the common electrode 220. A light visual angle pattern 236 is formed on the common electrode 220 corresponding to pixel areas 101 so as to widen a visual angle of an image. In order to prevent decrease of brightness needed to display the image, the light visual angle pattern 236 may comprise a transparent organic material. Liquid crystal having liquid crystal molecules vertically aligned is disposed between the second substrate 200 and a first substrate 100 facing the second substrate 200.

In this exemplary embodiment, the light blocking pattern 230 is formed on the second transparent substrate 210 so as to block the light leaked through between the pixel areas 101. Also, the light visual angle pattern 236 having the transparent organic material is formed on the common electrode 220 corresponding to the pixel areas 101. Thus, the LCD apparatus 400 may improve display quality thereof.

Embodiment 11

Figure 14:
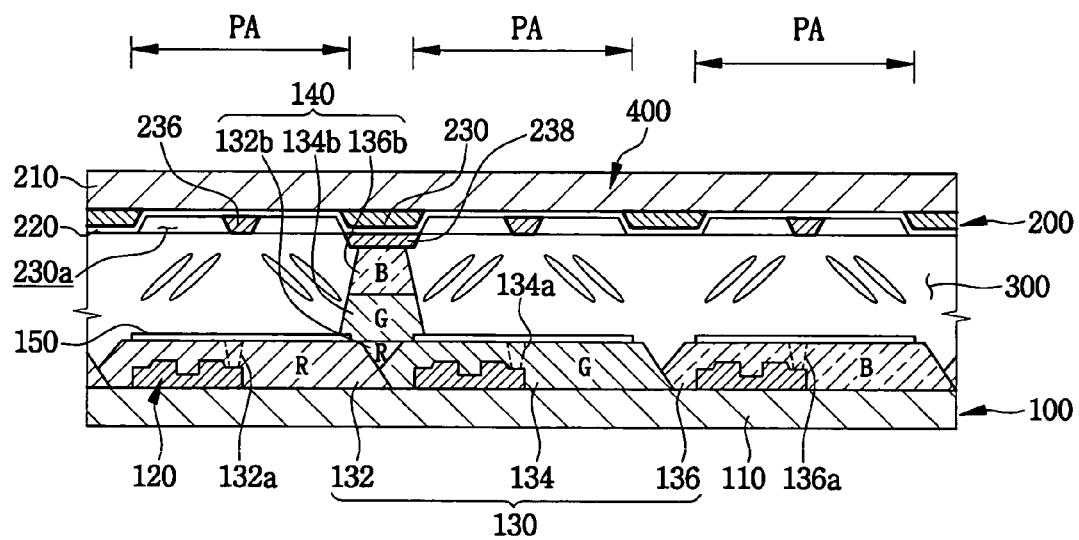
FIG. 14 is a cross-sectional view showing an LCD apparatus according to an eleventh exemplary embodiment of the present invention.

FIG. 14 is a cross-sectional view showing an LCD apparatus according to an eleventh exemplary embodiment of the present invention. In FIG. 14, the same reference numerals denote the same elements in FIG. 13, and thus the detailed descriptions of the same elements will be omitted.

Referring to FIG. 14, a transparent spacer 238 is formed at a position corresponding to a light blocking pattern 230 disposed at a position between pixel areas 101. A common electrode 220 formed over a second transparent substrate 210 is disposed between the light blocking pattern 230 and transparent spacer 238. A transparent light visual angle pattern 236 is formed on the second transparent substrate 210 corresponding to the pixel areas 101. In the pixel areas 101, the common electrode 220 is also disposed between the second transparent substrate 210 and light visual angle pattern 236. The transparent spacer 238 and transparent light visual angle pattern 236 are substantially and simultaneously formed by patterning a transparent organic layer formed on the common electrode 220.

In this exemplary embodiment, when the color filter spacer 140 has a height lower than that of a cell gap between the first and second substrates 100 and 200, the transparent spacer 238 may uniformly maintain the cell gap between the first and second substrates 100 and 200 with the color filter spacer 140, thereby preventing variation of the cell gap of an LCD apparatus 400. The light blocking pattern 230 may block the light incident into between the pixel areas 101 and the light visual angle pattern 236 may widen a visual angle of an image. Thus, an LCD apparatus 400 may improve display quality thereof.

Embodiment 12

Figure 15:
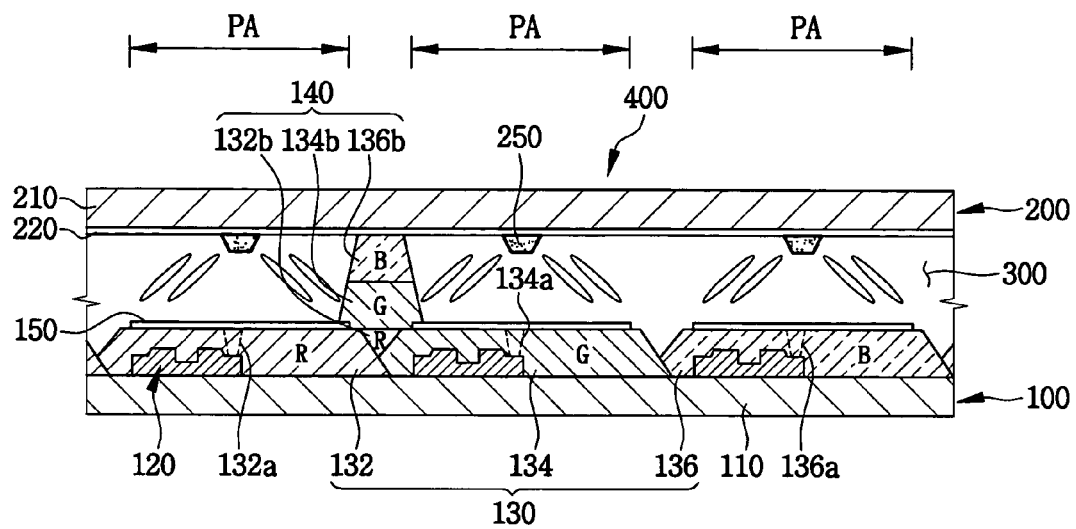
FIG. 15 is a cross-sectional view showing an LCD apparatus according to a twelfth exemplary embodiment of the present invention.

FIG. 15 is a cross-sectional view showing an LCD apparatus according to a twelfth exemplary embodiment of the present invention. In FIG. 15, the same reference numerals denote the same elements in FIGS. 1 to 3, and thus the detailed descriptions of the same elements will be omitted.

Referring to FIG. 15, in case that a cell gap between first and second substrates 100 and 200 is substantially equal to a height of a color filter spacer 140, a light visual angle pattern 250 is formed on a common electrode 220 formed on a second transparent substrate 210. The light visual angle pattern 250 is disposed at a position corresponding to pixel areas 101. In order to form the light visual angle pattern 250, a transparent organic layer is formed on the common electrode 220, and patterned through a patterning process. The light visual angle pattern 250 varies arrangement of liquid crystal 300 disposed between the first and second substrates 100 and 200 so as to widen a visual angle of an image. The liquid crystal 300 has liquid crystal molecules vertically aligned.

In this exemplary embodiment, the light visual angle pattern 250 comprising a transparent organic material is formed on the second transparent 200, which is corresponding to the pixel areas 101. Thus, an LCD apparatus 400 may widen the visual angle of the image displayed thereon without decrease of brightness of the light passing through the pixel areas 101.

Embodiment 13

Figure 16:
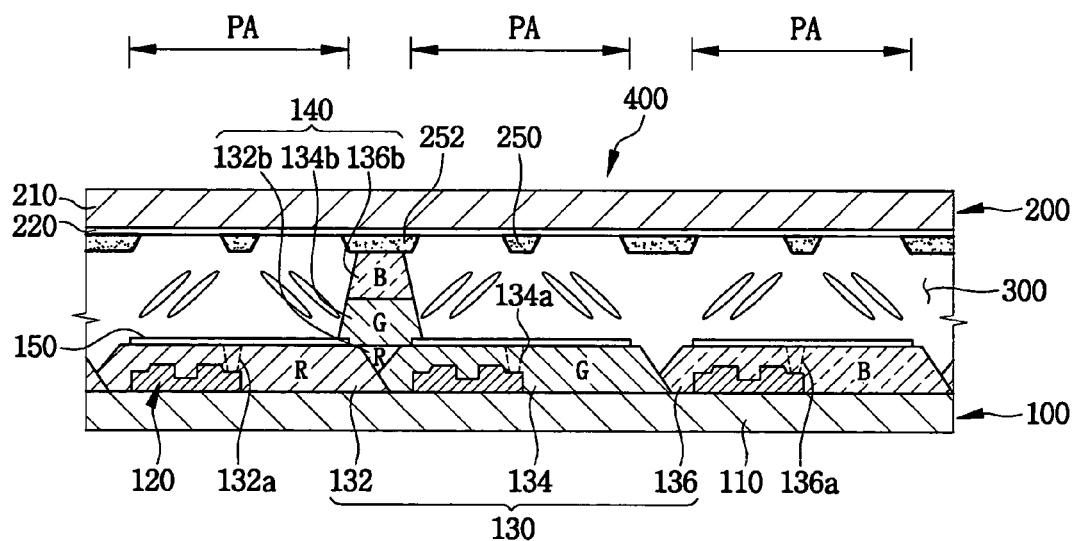
FIG. 16 is a cross-sectional view showing an LCD apparatus according to a thirteenth exemplary embodiment of the present invention.

FIG. 16 is a cross-sectional view showing an LCD apparatus according to a thirteenth exemplary embodiment of the present invention. In FIG. 16, the same reference numerals denote the same elements in FIGS. 1 to 3, and thus the detailed descriptions of the same elements will be omitted.

Referring to FIG. 16, in case that a cell gap between first and second substrates 100 and 200 is higher than a height of a color filter spacer 140 formed on the first substrate 100, a transparent spacer 252 is further formed on a common electrode 220 that is formed on a second transparent substrate 210. The transparent spacer 252 is disposed at a position between pixel areas 101. The transparent spacer 252 is formed with a light visual angle pattern 250 when a transparent organic layer formed on the common electrode 220 is patterned. Also, the transparent spacer 252 has a thickness substantially equal to a height difference between the cell gap and color filter spacer 140. Thus, the transparent spacer 252 may uniformly maintain the cell gap between the first and second substrates 100 and 200 with a color filter spacer 140.

A light visual angle pattern 250 having a line shape is formed on the common electrode 220 corresponding to pixel areas 101. The light visual angle pattern 250 is also formed with the transparent spacer 252 when the transparent organic layer is patterned. The light visual angle pattern 250 varies arrangement of liquid crystal 300 disposed between the first and second substrates 100 and 200 so as to widen a visual angle of an image. For widening the visual angle, the liquid crystal 300 has liquid crystal molecules vertically aligned.

In this exemplary embodiment, the transparent spacer 252 formed on the second substrate 200 connects between the color filter spacer 140 and common electrode 220 formed on the second substrate 210. That is, the transparent spacer 252 has the thickness substantially equal to the height difference between the cell gap and color filter spacer 140, thereby maintaining the cell gap between the first and second substrates 100 and 200.

The light visual angle pattern 250 formed on the common electrode 220 increases brightness the light passing through the pixel areas 101. Thus, an LCD apparatus 400 may widen the visual angle of the image displayed thereon without decrease of brightness of the light passing through the pixel areas 101.

Embodiment 14

Figure 17:
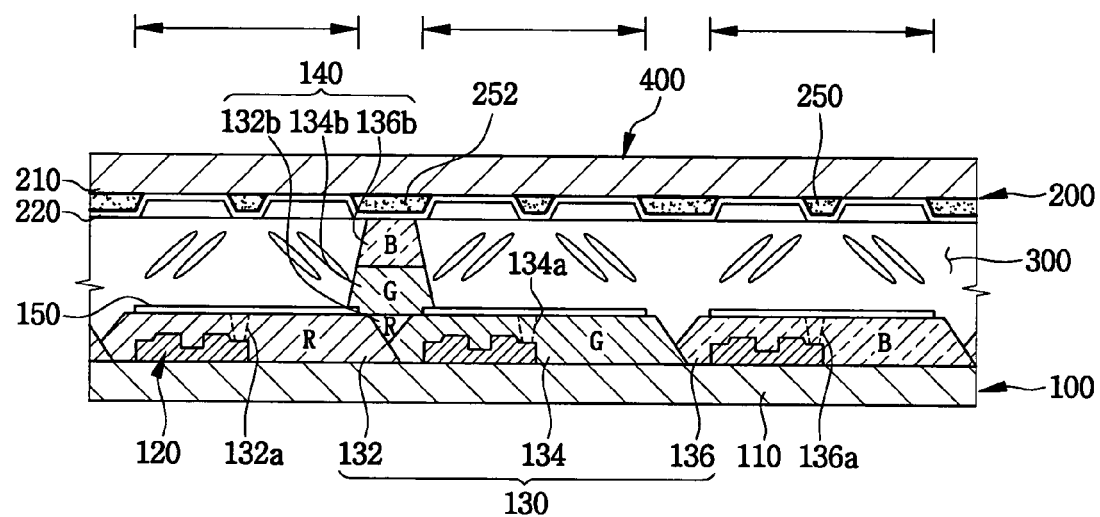
FIG. 17 is a cross-sectional view showing an LCD apparatus according to a fourteenth exemplary embodiment of the present invention.

FIG. 17 is a cross-sectional view showing an LCD apparatus according to a fourteenth exemplary embodiment of the present invention. In FIG. 17, the same reference numerals denote the same elements in FIGS. 1 to 3, and thus the detailed descriptions of the same elements will be omitted.

Referring to FIG. 17, when a transparent organic layer formed on a second transparent substrate 210 of a second substrate 200 is patterned, a transparent spacer 250 and a transparent light visual angle pattern 252 are formed on the second transparent substrate 210. A common electrode 220 is formed over the second transparent substrate 210, and thus the transparent spacer 250 and transparent light visual angle pattern 252 are covered by means of the common electrode 200.

The common electrode 220 formed on the transparent spacer 250, transparent light visual angle pattern 252 and second transparent substrate 210 reinforces the transparent spacer 250, thereby preventing the transparent spacer 250 230 from being damaged due to an impact externally provided. Thus, a cell gap between the first and second substrates 100 and 200 may be uniformly maintained.

In this exemplary embodiment, in order to prevent the transparent spacer 250 from being damaged or deformed, the common electrode 220 is formed on the transparent spacer 250 and transparent light visual angle pattern 252. Thus, an LCD apparatus 400 may maintain the cell gap between the first and second substrates 100 and 200, thereby improving display quality thereof.

Embodiments of Manufacturing Method of a Surface Light Source Device

Embodiment 15

Figure 18A:
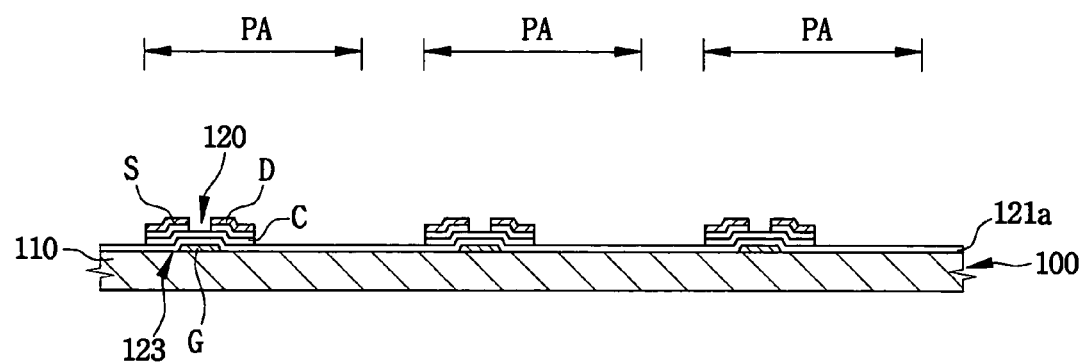
FIG. 18A is a cross-sectional view showing a first substrate having a driving voltage applying device according to a fifteenth exemplary embodiment of the present invention.
Figure 18B:
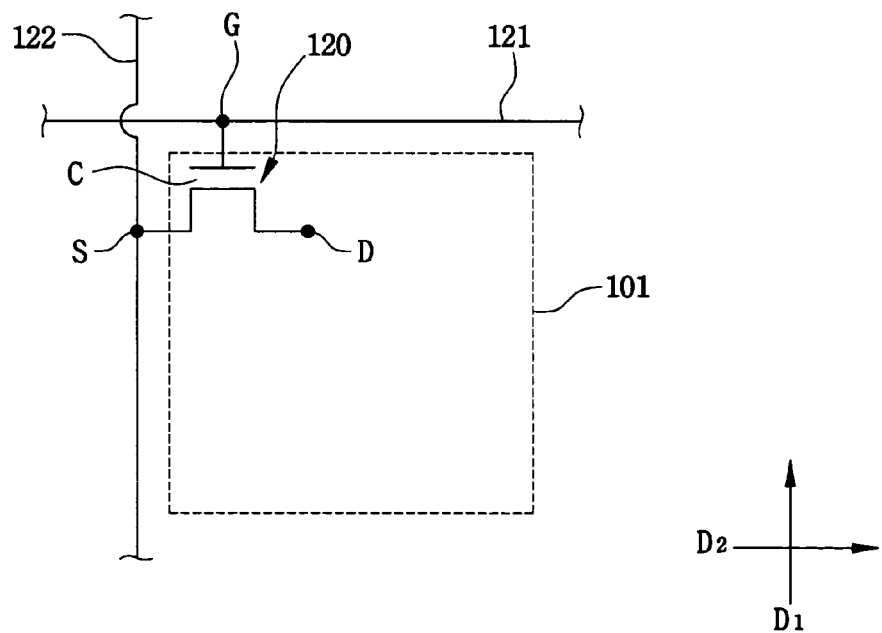
FIG. 18B is a schematic circuit diagram showing a driving voltage applying device.

FIG. 18A is a cross-sectional view showing a first substrate having a driving voltage applying device according to a fifteenth exemplary embodiment of the present invention. FIG. 18B is a schematic circuit diagram showing a driving voltage applying device.

Referring to FIGS. 18A and 18B, a first transparent substrate 110 of a first substrate 100 includes a plurality of pixel areas 101 corresponding to a resolution of an LCD apparatus. For example, in case that the LCD apparatus performs a full color display and has a resolution of 1024×768, the first transparent substrate 110 includes the pixel areas of 1024×768×3 units.

Each of the pixel areas 101 includes a driving voltage applying device 120 having a TFT 120, a gate bus line 121 and data bus line 122.

In order to form the TFT 123, gate bus line 121 and data bus line 122, a gate metal thin-film layer is formed over the first transparent substrate 110. The gate metal thin-film layer is patterned through a photolithography process to form the gate bus line 121 and gate electrode portion G on the first transparent substrate 110.

The gate bus line 121 is formed on the first transparent substrate 110 and extended in a first direction D1. In case that the LCD apparatus has the resolution of 1024×768, the gate bus line 121 of 768 units are formed between the pixel areas 101. The gate electrode portion G is extended from a corresponding gate bus line to a corresponding pixel area. In this exemplary embodiment, since the pixel areas 101 of 1024×3 units are formed in the first direction, the gate electrode portion G of 1024×3 units are formed against one gate bus line 121.

A gate insulating layer 121a is formed on the first transparent substrate 110 to cover the gate bus line 121 and gate electrode portion G.

An amorphous silicon layer, an $n^+$ amorphous silicon layer and a source/drain metal layer are successively formed on the gate insulating layer 121a.

A photoresist pattern is formed on the source/drain layer by patterning a photoresist layer formed on the source/drain layer. When the amorphous silicon layer, $n^+$ amorphous silicon layer and source/drain metal layer are successively etched using the photoresist pattern as a mask, the data bus line 122 extended in the second direction D2, a source electrode portion S and a drain electrode portion D are formed. Then, the photoresist pattern is removed through a photoresist strip process or an ashing process to form a channel layer C by the patterned $n^+$ amorphous silicon layer.

Figure 19:
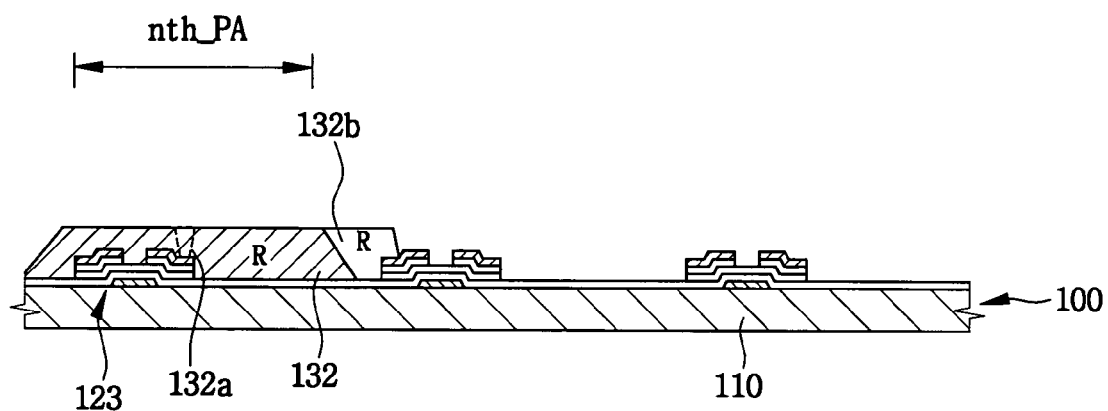
FIG. 19 is a cross-sectional view showing a red color filter formed at pixel areas and a red color filter spacer formed between pixel areas shown in FIG. 19.

FIG. 19 is a cross-sectional view showing a red color filter formed at pixel areas and a red color filter spacer formed between pixel areas shown in FIG. 18.

Referring to FIG. 19, a red color filter 132 is formed at every nth pixel area of the first transparent substrate 110, where n is a natural number. The red color filter 132 is formed by patterning a red color filter layer formed over the first transparent substrate 110 through a photolithography process. A contact hole 132a is formed with the red color filter 132 while the red color filter 132 is formed, through which the drain electrode D of the TFT 123 (refer to FIG. 18) covered by the red color filter 132 is partially exposed.

The red color filter spacer 132b is formed with the red color filter 132 while the red color filter 132 is formed, and disposed between the pixel areas 101. The red color filter spacer 132b performs a role as a color filter spacer (not shown) with green and blue color spacers described below for supporting a second substrate (not shown) combined with the first substrate 100.

Figure 20:
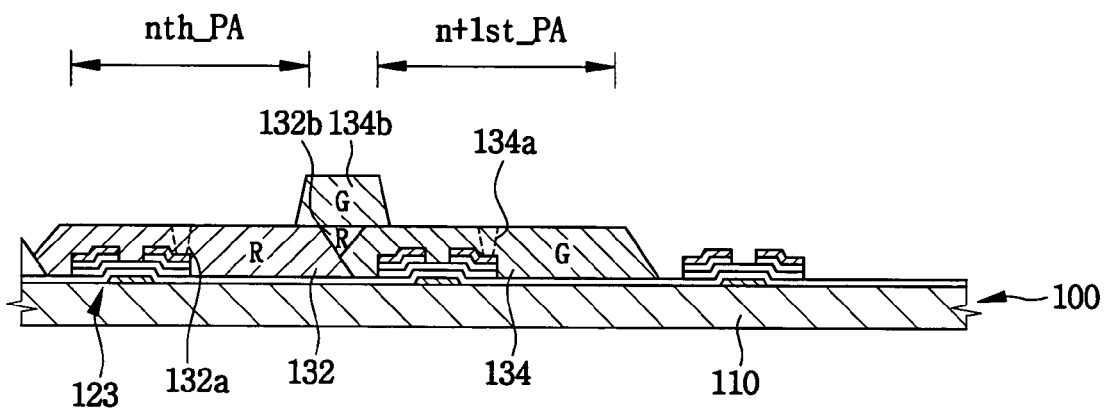
FIG. 20 is a cross-sectional view showing a green color filter formed at pixel areas and a green color filter spacer formed between pixel areas shown in FIG. 18.

FIG. 20 is a cross-sectional view showing a green color filter formed at pixel areas and a green color filter spacer formed between pixel areas shown in FIG. 18.

Referring to FIG. 20, a green color filter 134 is formed at every $n+1^{st}$ pixel area of the first transparent substrate 110, where n is a natural number. The green color filter 134 is formed by patterning a green color filter layer formed over the first transparent substrate 110 through a photolithography process. A contact hole 134a is formed with the green color filter 134 while the green color filter 134 is formed, through which the drain electrode D of the TFT 123 covered by the green color filter 134 is partially exposed.

The green color filter spacer 134b is formed with the green color filter 134 while the green color filter 134 is formed. The green color filter spacer 134b is disposed on the red color filter spacer 134b so as to perform the role as the color filter spacer (not shown) for supporting a second substrate (not shown) combined with the first substrate 100.

Figure 21:
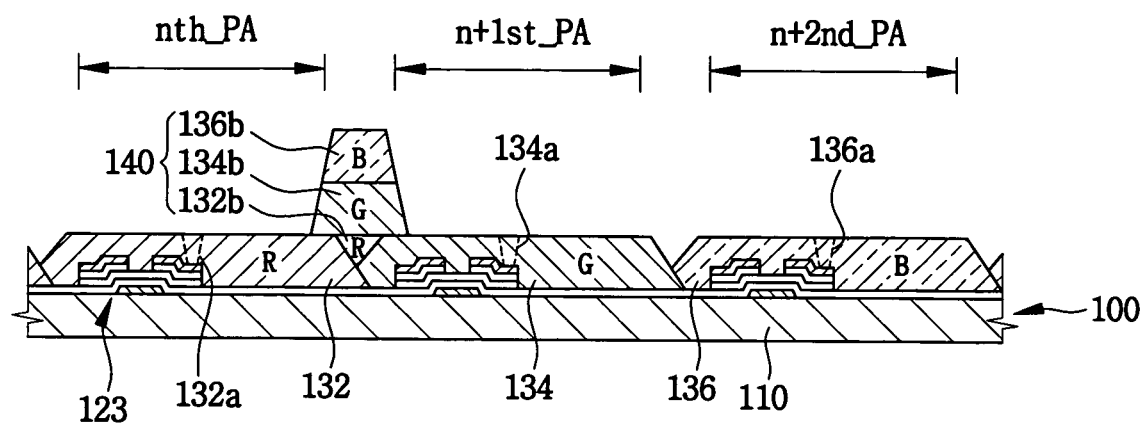
FIG. 21 is a cross-sectional view showing a blue color filter formed at pixel areas and a blue color filter spacer formed between pixel areas shown in FIG. 18.

FIG. 21 is a cross-sectional view showing a blue color filter formed at pixel areas and a blue color filter spacer formed between pixel areas shown in FIG. 18.

Referring to FIG. 21, a blue color filter 136 is formed at every $n+2^{nd}$ pixel area of the first transparent substrate 110, where n is a natural number. The blue color filter 136 is formed by patterning a blue color filter layer formed over the first transparent substrate 110 through a photolithography process. A contact hole 136a is formed with the blue color filter 136 while the blue color filter 136 is formed, through which the drain electrode D of the TFT 123 covered by the blue color filter 136 is partially exposed.

The blue color filter spacer 136b is formed with the blue color filter 136 while the blue color filter 136 is formed. The blue color filter spacer 136b is disposed on the green color filter spacer 134b so as to perform the role as the color filter spacer (not shown) for supporting a second substrate (not shown) combined with the first substrate 100.

Figure 22:
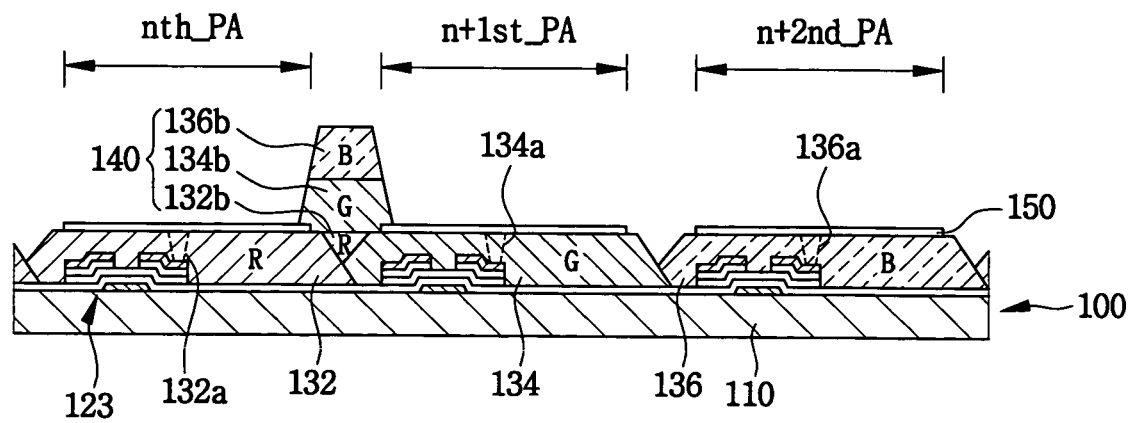
FIG. 22 is a cross-sectional view showing a pixel electrode formed on the color filter shown in FIG. 21.

FIG. 22 is a cross-sectional view showing a pixel electrode formed on the color filter shown in FIG. 21.

Referring to FIG. 22, a transparent and conductive layer comprising ITO or IZO is formed over the first substrate 100. In this exemplary embodiment, the ITO layer is formed over the first transparent substrate 110 of the first substrate 100.

The ITO layer is patterned to form the pixel electrode 150 on the red, green and blue color filters 132, 134 and 136. The pixel electrode 150 is electrically connected to the drain electrode D of the TFT 123 through the contact holes 132a, 134a and 136a formed at the red, green and blue color filters 132, 134 and 136, respectively.

The first substrate 100 may further include an alignment layer (not shown) having an alignment groove formed thereon.

Figure 23:
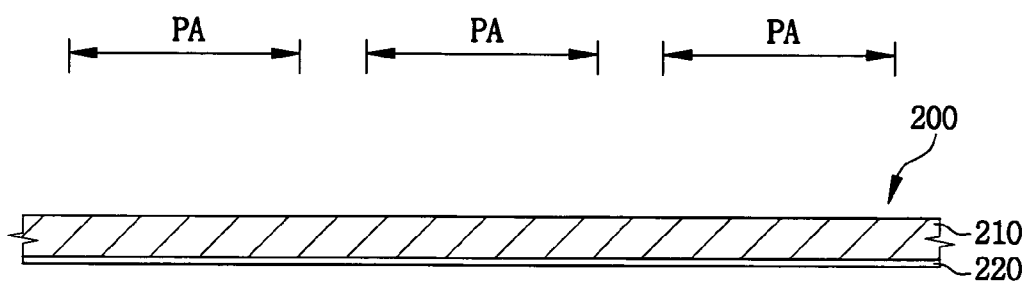
FIG. 23 is a cross-sectional view showing a second substrate of an LCD apparatus according to the fifteenth exemplary embodiment of the present invention.

FIG. 23 is a cross-sectional view showing a second substrate of an LCD apparatus according to the fifteenth exemplary embodiment of the present invention.

Referring to FIG. 23, a common electrode 220 is formed over a second transparent substrate 210 of a second substrate 200. The common electrode 220 comprises the ITO layer or IZO layer.

Figure 24:
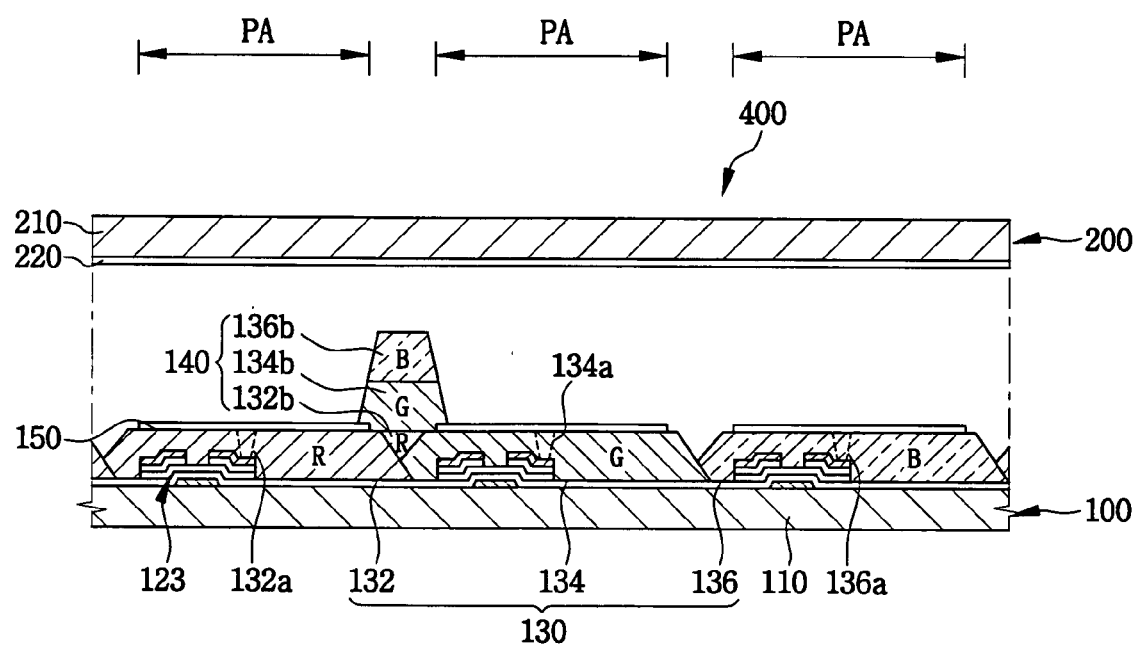
FIG. 24 is a cross-sectional view showing a first substrate assembled with a second substrate of an LCD apparatus according to the fifteenth exemplary embodiment of the present invention.

FIG. 24 is a cross-sectional view showing a first substrate assembled with a second substrate of an LCD apparatus according to the fifteenth exemplary embodiment of the present invention.

Referring to FIG. 24, the second substrate 200 on which the common electrode 220 is formed is assembled with the first substrate 100 on which the driving voltage applying device 120, color filter 130 and pixel electrode 150 such that the common electrode 220 faces the pixel electrode 150. The liquid crystal 300 is disposed between the first and second substrates 100 and 200.

In this exemplary embodiment, the red, green and blue color filters 132, 134 and 136 are formed at the nth, n+1$^{st}$ and n+2$^{nd}$ pixel areas n$^{th}$_PA, n+1$^{st}$_PA and n+2$^{nd}$_PA, respectively. The color filter spacer 140 having the red, green and blue color filter spacers 132b, 134b and 136b sequentially stacked up each other is formed at a position between the nth, n+1$^{st}$ and n+2$^{nd}$ pixel areas n$^{th}$_PA, n+1$^{st}$_PA and n+2$^{nd}$_PA. The color filter spacer 140 may uniformly maintain the cell gap between the first and second substrates 100 and 200. Thus, the LCD apparatus 400 does not need a separate spacer, thereby simplifying and reducing the processes, for example, such as forming a photoresist layer, patterning the photoresist layer and cleaning the patterned photoresist layer, for the LCD apparatus 400.

Embodiment 16

Figure 25:
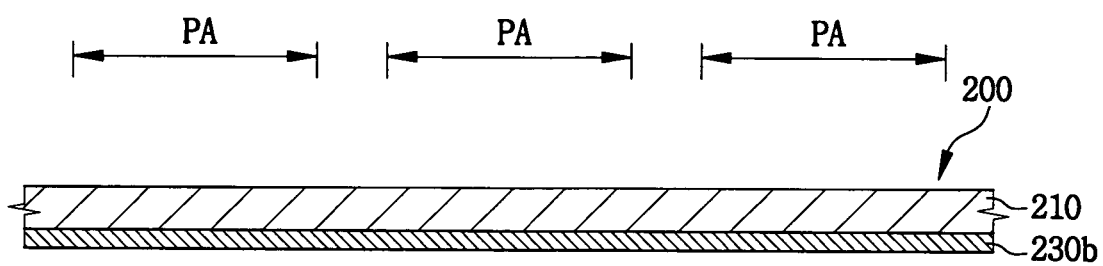
FIGS. 25 and 26 are cross-sectional views showing a second substrate according to a sixteenth exemplary embodiment of the present invention.
Figure 26:
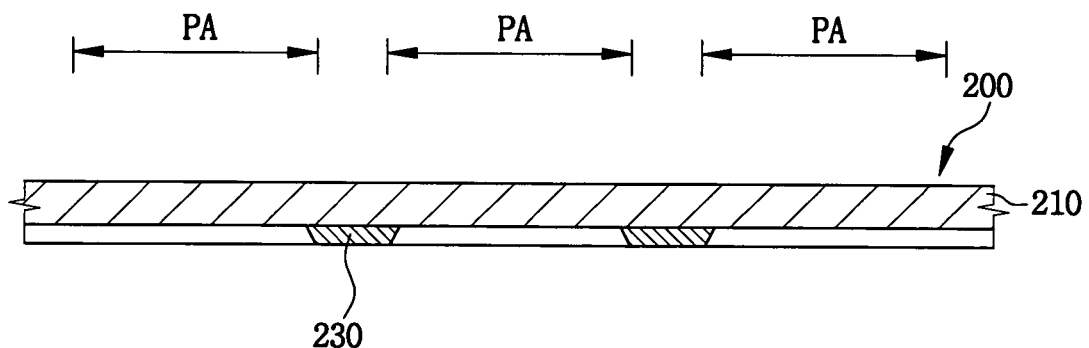

FIGS. 25 and 26 are cross-sectional views showing a second substrate according to a sixteenth exemplary embodiment of the present invention. In FIGS. 25 and 26, the same reference numerals denote the same elements in FIGS. 23 and 24, and thus the detailed descriptions of the same elements will be omitted.

Referring to FIG. 25, a light blocking layer 230b that comprises an organic material having a light transmittance or a light blocking rate substantially equal to that of a chromium Cr is formed over a second transparent substrate 210.

Referring to FIG. 26, the light blocking layer 230b is patterned through a photolithography process to form a light blocking pattern 230 at a position between pixel areas PA. Thus, the light blocking pattern 230 transmits light incident through the pixel areas PA and blocks the light incident through between the pixel areas PA. The light blocking pattern 230 makes contact with an upper surface of the color filter spacer 140 formed on the first substrate 100 (refer to FIG. 24).

A common electrode 220 comprising ITO or IZO is formed over the second transparent substrate 210 on which the light blocking pattern 230 is formed (refer to FIG. 7).

In this exemplary embodiment, a color filter 130 is formed at the pixel areas PA of a first substrate 100 and a color filter spacer 140 is formed between the pixel areas PA. The color filter spacer 140 may uniformly maintain a cell gap between the first and second substrates 100 and 200. Thus, an LCD apparatus 400 does not need a separate spacer, thereby simplifying and reducing the processes, for example, such as forming a photoresist layer, patterning the photoresist layer and cleaning the patterned photoresist layer, for the LCD apparatus 400.

Embodiment 17

Figure 27:
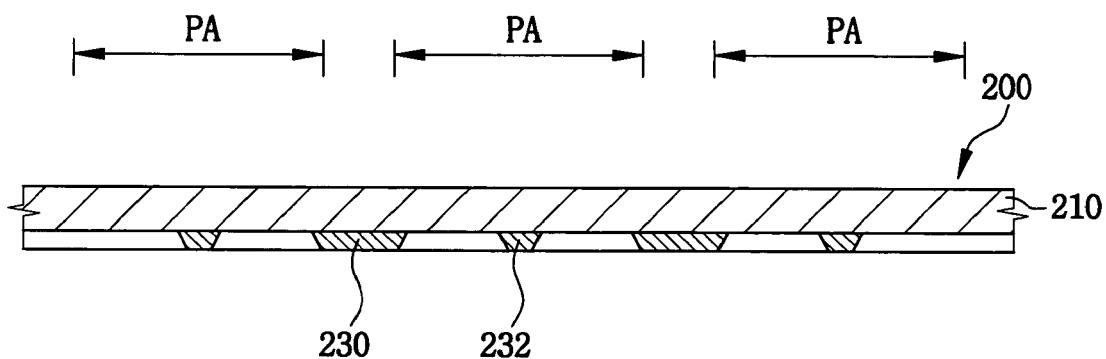
FIG. 27 is a cross-sectional view showing a second substrate according to a seventeenth exemplary embodiment of the present invention.

FIG. 27 is a cross-sectional view showing a second substrate according to a seventeenth exemplary embodiment of the present invention. In FIG. 27, the same reference numerals denote the same elements in FIGS. 25 and 26, and thus the detailed descriptions of the same elements will be omitted.

Referring to FIG. 27, when a light blocking layer formed on the second transparent substrate 210 is patterned, a light visual angle pattern 232 is formed on the second transparent substrate 210 corresponding to pixel areas PA and a light blocking pattern 230 is formed between the pixel areas PA. The light visual angle pattern 232 and light blocking pattern 230 are substantially and simultaneously formed by patterning the light blocking layer. The light visual angle pattern 232 having a line shape widens a visual angle of an image and the light blocking pattern 230 blocks light incident through between the pixel areas PA, thereby improving display quality of the image. For improving the display quality, liquid crystal having liquid crystal molecules vertically aligned is disposed between the first and second substrates 100 and 200.

In this exemplary embodiment, the light visual angle pattern 232 is formed on the second transparent substrate 210 corresponding to pixel areas PA and the light blocking pattern 230 is formed between the pixel areas PA. Thus, an LCD apparatus may improve the display quality of the image and be manufactured through simplified and reduced processes.

Embodiment 18

Figure 28:
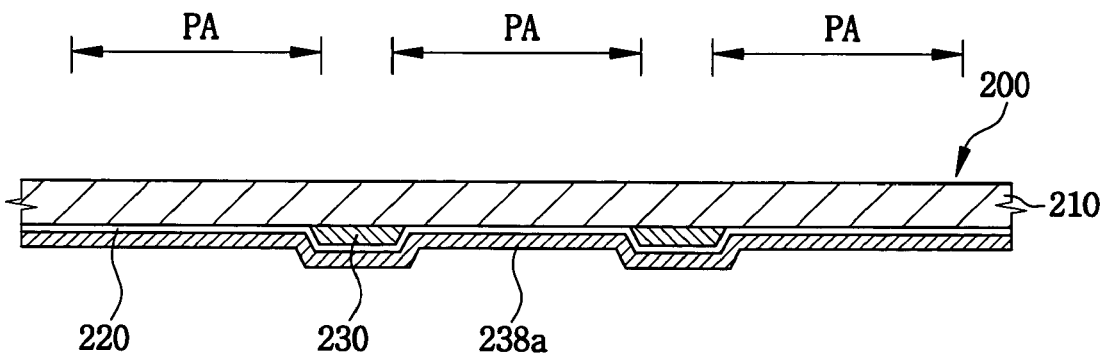
FIGS. 28 and 29 are cross-sectional views showing a second substrate according to a eighteenth exemplary embodiment of the present invention.
Figure 29:
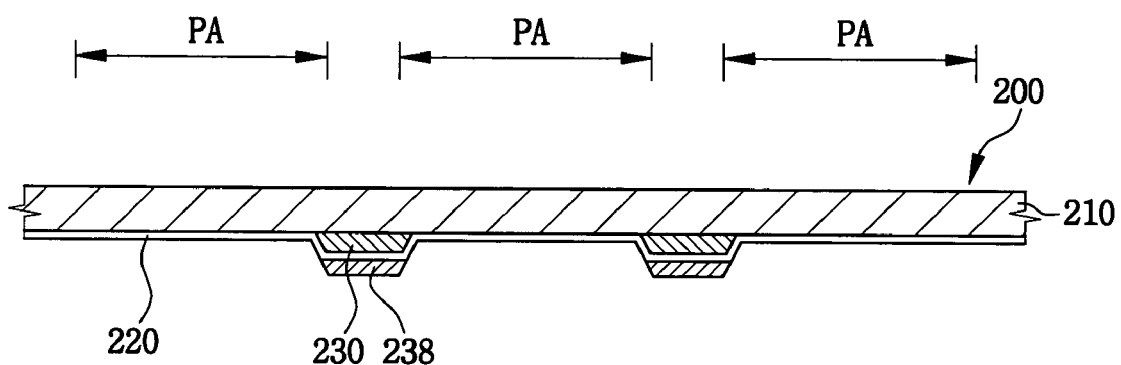

FIGS. 28 and 29 are cross-sectional views showing a second substrate according to an eighteenth exemplary embodiment of the present invention. In FIGS. 28 and 29, the same reference numerals denote the same elements in FIGS. 25 and 26, and thus the detailed descriptions of the same elements will be omitted.

Referring to FIGS. 28 and 29, a light blocking pattern 230 is formed on a second transparent substrate 210 of a second substrate 200. A common electrode 220 having ITO or IZO is formed over the second transparent substrate 210, and then a transparent organic layer 238a is formed over common electrode 220.

The transparent organic layer 238a is patterned through a photolithography process to form a transparent spacer 238 on the common electrode 220 corresponding to the light blocking pattern 230. The transparent spacer 238 faces an upper surface of a color filter spacer 140 formed on a first substrate 100 (refer to FIG. 14). When the first and second substrates 100 and 200 are assembled with each other, the transparent spacer 238 makes contact with the upper surface of the color filter spacer 140 to uniformly maintain a cell gap between the first and second substrates 100 and 200.

In this exemplary embodiment, the cell gap between the first and second substrates 100 and 200 may be uniformly maintained by means of the color filter spacer 140 formed on the first substrate 100, light blocking pattern 230 formed on the second substrate 200 corresponding to the color filter spacer 140 and transparent spacer 238.

Thus, an LCD apparatus does not need a separate spacer, thereby simplifying and reducing the processes, for example, such as forming a photoresist layer, patterning the photoresist layer and cleaning the patterned photoresist layer, for the LCD apparatus. Also, the LCD apparatus may provide an improved display quality because of the light blocking pattern 230 formed at a position between the pixel areas PA.

Embodiment 19

Figure 30:
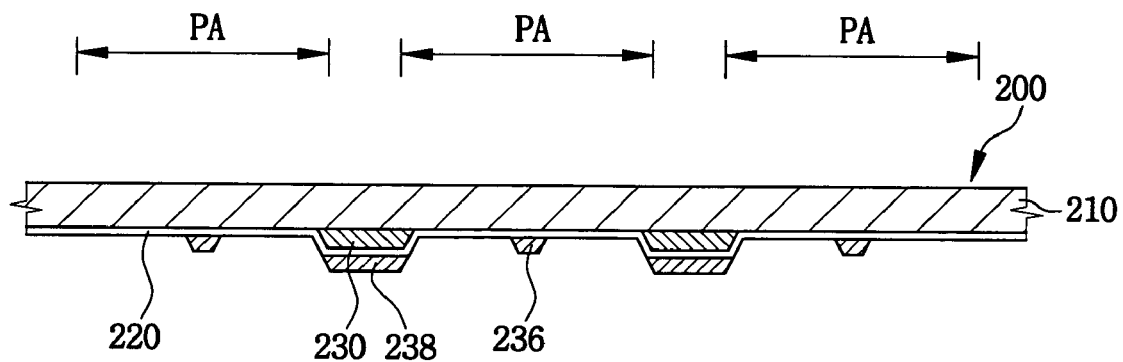
FIG. 30 is a cross-sectional view showing a second substrate according to a nineteenth exemplary embodiment of the present invention.

FIG. 30 is a cross-sectional view showing a second substrate according to a nineteenth exemplary embodiment of the present invention. In FIG. 30, the same reference numerals denote the same elements in FIGS. 28 and 29, and thus the detailed descriptions of the same elements will be omitted.

Referring to FIG. 30, a light blocking pattern 230 is formed on a second transparent substrate 210 of a second substrate 200. A common electrode 220 having ITO or IZO is formed over the second transparent substrate 210, and then a transparent organic layer is formed over common electrode 220. The transparent organic layer is patterned through a photolithography process to form a transparent spacer 238 on the common electrode 220 corresponding to the light blocking pattern 230.

The transparent spacer 238 is disposed at a position facing an upper surface of a color filter spacer 140 formed on a first substrate 100 (refer to FIG. 14). When the first and second substrates 100 and 200 are assembled with each other, the transparent spacer 238 makes contact with the upper surface of the color filter spacer 140 to uniformly maintain a cell gap between the first and second substrates 100 and 200. A light visual angle pattern 236 is formed on the common electrode 220 corresponding to the pixel areas PA while the transparent spacer 238 is formed. The light visual angle pattern 236 widens a visual angle of an image. In this exemplary embodiment, in order to widen the visual angle of the image without decrease of brightness, liquid crystal having liquid crystal molecules vertically aligned is disposed between the first and second substrates 100 and 200.

In this exemplary embodiment, the cell gap between the first and second substrates 100 and 200 may be uniformly maintained by means of the color filter spacer 140 formed on the first substrate 100, light blocking pattern 230 formed on the second substrate 200 corresponding to the color filter spacer 140 and transparent spacer 238.

Thus, an LCD apparatus does not need a separate spacer, thereby simplifying and reducing the processes, for example, such as forming a photoresist layer, patterning the photoresist layer and cleaning the patterned photoresist layer, for the LCD apparatus. Also, the LCD apparatus may provide an improved display quality because of the light blocking pattern 230 formed at a position between the pixel areas PA.

Embodiment 20

Figure 31:
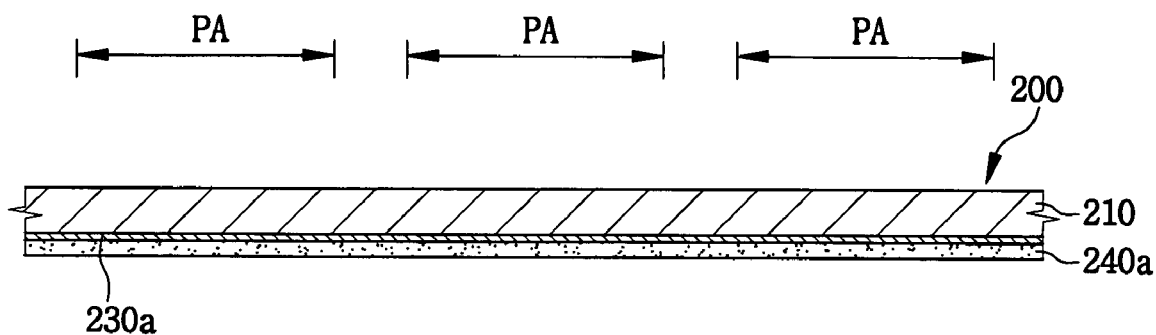
FIGS. 31 to 33 are cross-sectional views showing a second substrate according to a twentieth exemplary embodiment of the present invention.
Figure 32:
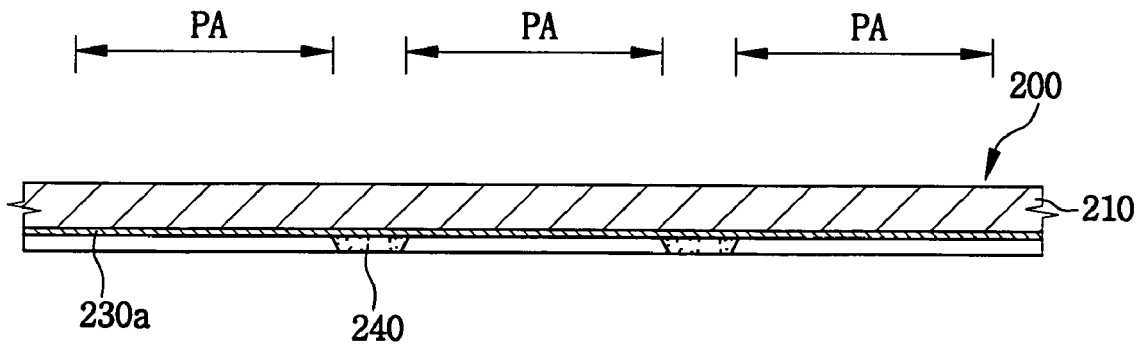
Figure 33:
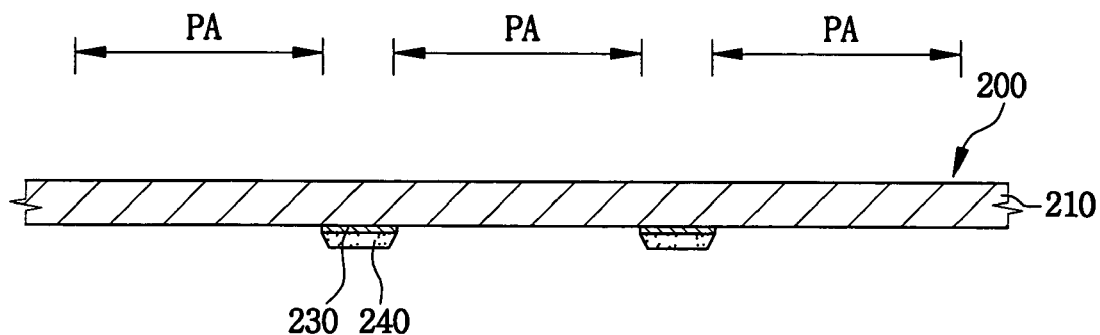

FIGS. 31 to 33 are cross-sectional views showing a second substrate according to a twentieth exemplary embodiment of the present invention. In FIGS. 31 to 33, the same reference numerals denote the same elements in FIGS. 18A to 24, and thus the detailed descriptions of the same elements will be omitted.

Referring to FIG. 31, a light blocking layer 230a comprising chromium Cr or a double-layer light blocking layer comprising chromium Cr and chromium oxide $CrO_2$ is formed over a second transparent substrate 210 of a second substrate 200. In this exemplary embodiment, the light blocking layer 230a comprises the chromium Cr.

A photosensitive layer 240a comprising a photosensitive material is formed over the light blocking layer 230a.

Referring to FIG. 32, the photosensitive layer 240a is patterned to form a photosensitive pattern 240 on the light blocking layer 230a. The photosensitive pattern 240 has a lattice-shape and is formed at a position between the pixel areas PA.

Referring to FIG. 33, the light blocking layer 230a is patterned using the photosensitive pattern 240 as a mask. Thus, a light blocking pattern 230 is formed at a position on the second transparent substrate 210 corresponding to the photosensitive pattern 240. A common electrode 220 comprising ITO or IZO on the light blocking pattern 230 (refer to FIG. 11).

In this exemplary embodiment, the photosensitive pattern 240 is formed on the light blocking pattern 230 formed on the second transparent substrate 210. The photosensitive pattern 240 makes contact with the color filter spacer 140 formed on the first substrate 100, thereby uniformly maintaining the cell gap between the first and second substrates 100 and 200.

Embodiment 21

Figure 34:
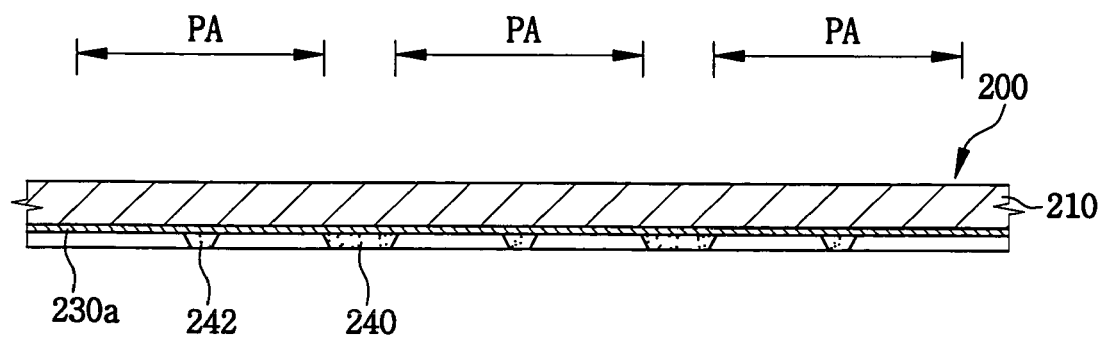
FIGS. 34 and 35 are cross-sectional views showing a second substrate according to a twenty-first exemplary embodiment of the present invention.
Figure 35:
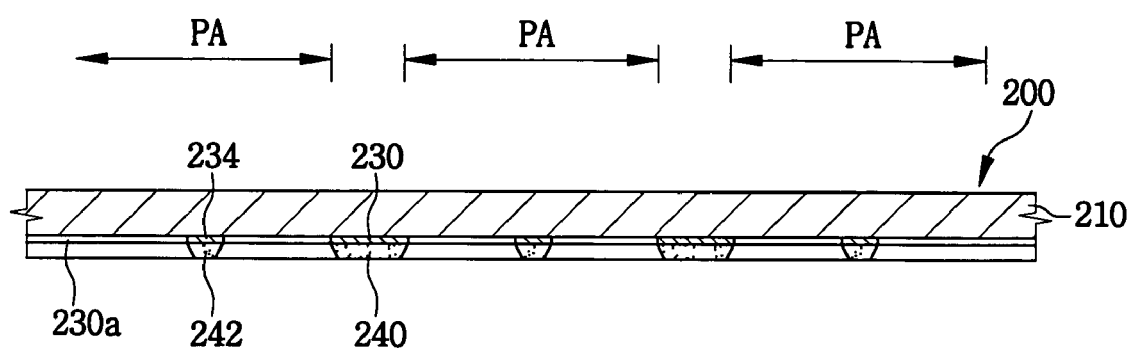

FIGS. 34 and 35 are cross-sectional views showing a second substrate according to a twenty-first exemplary embodiment of the present invention. In FIGS. 34 and 35, the same reference numerals denote the same elements in FIGS. 31 to 33, and thus the detailed descriptions of the same elements will be omitted.

Referring to FIG. 34, a light blocking layer 230a comprising chromium Cr or a double-layer light blocking layer comprising chromium Cr and chromium oxide $CrO_2$ is formed over a second transparent substrate 210 of a second substrate 200. In this exemplary embodiment, the light blocking layer 230a comprises the chromium Cr.

A photosensitive layer comprising a photosensitive material is formed over the light blocking layer 230a. The photosensitive layer is patterned to form a photosensitive pattern 240 and a first light visual angle pattern 242 on the light blocking layer 230a.

The photosensitive pattern 240 having a lattice-shape is formed at a position between the pixel areas PA. The first light visual angle pattern 242 having a line shape is formed at a position corresponding to the pixel areas PA.

Referring to FIG. 35, the light blocking layer 230a is patterned using the photosensitive pattern 240 and first light visual angle pattern 242 as a mask. Thus, a light blocking pattern 230 is formed at a position on the second transparent substrate 210 corresponding to the photosensitive pattern 240. Also, a second light visual angle pattern 234 is formed at position on the second transparent substrate 210 corresponding to the first light visual angle pattern 242. A common electrode 220 comprising ITO or IZO on the photosensitive pattern 240, first light visual angle pattern 242 and second transparent substrate 210 (refer to FIG. 12).

In this exemplary embodiment, the photosensitive pattern 240 is formed on the light blocking pattern 230 formed on the second transparent substrate 210. The photosensitive pattern 240 makes contact with the color filter spacer 140 formed on the first substrate 100, thereby uniformly maintaining the cell gap between the first and second substrates 100 and 200. Also, since the first and second light visual angle pattern 242 and 234 are formed with the photosensitive pattern 240 and light blocking pattern 230, respectively, an LCD apparatus may be manufactured through simplified and reduced processes.

Embodiment 22

Figure 36:
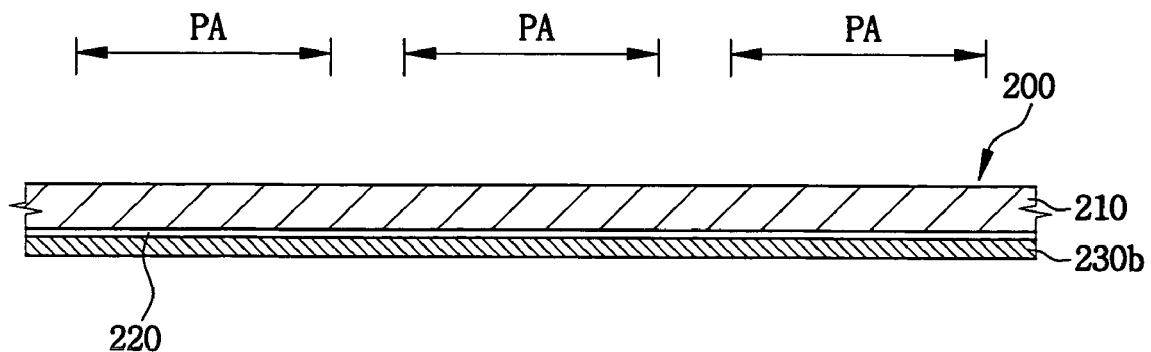
FIGS. 36 and 37 are cross-sectional views showing a second substrate according to a twenty-second exemplary embodiment of the present invention.
Figure 37:
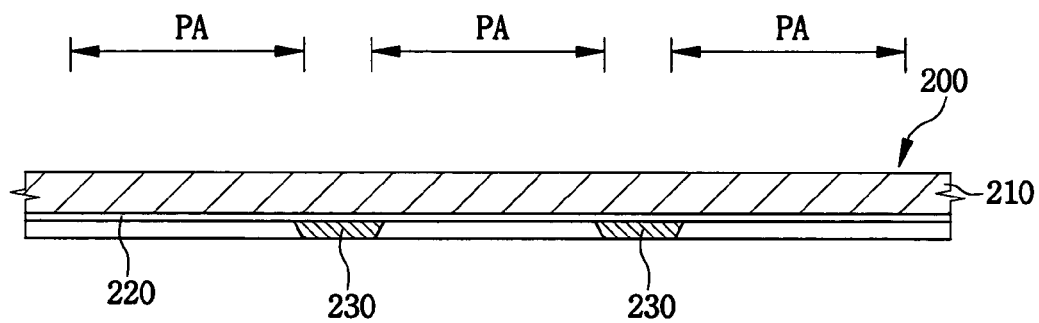

FIGS. 36 and 37 are cross-sectional views showing a second substrate according to a twenty-second exemplary embodiment of the present invention. In FIGS. 36 and 37, the same reference numerals denote the same elements in FIGS. 25 and 26, and thus the detailed descriptions of the same elements will be omitted.

Referring to FIG. 36, a common electrode 220 comprising ITO or IZO is formed over a second transparent substrate 210. A light blocking layer 230b that comprises an organic material having a light transmittance or a light blocking rate substantially equal to that of a chromium Cr is formed over the common electrode 220.

Referring to FIG. 37, the light blocking layer 230b is patterned through a photolithography process to form a light blocking pattern 230 at a position between pixel areas PA. The light blocking pattern 230 transmits light incident through the pixel areas PA, and blocks the light incident through between the pixel areas PA. The light blocking pattern 230 makes contact with an upper surface of the color filter spacer 140 formed on a first substrate 100 (refer to FIG. 24).

In this exemplary embodiment, the light blocking pattern 230 disposed at a position between the pixel areas PA is formed on the common electrode 220. The light blocking pattern 230 makes contact with the upper surface of the color filter spacer 140, thereby uniformly maintaining a cell gap between the first and second substrates 100 and 200. Thus, an LCD apparatus may be manufactured through simplified and reduced processes because the LCD apparatus does not need a separate spacer for maintaining the cell gap.

Embodiment 23

Figure 38:
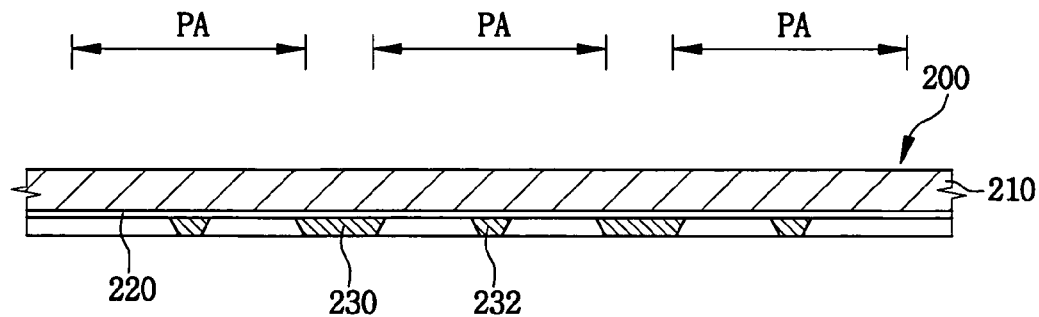
FIG. 38 is a cross-sectional view showing a second substrate according to a twenty-third exemplary embodiment of the present invention.

FIG. 38 is a cross-sectional view showing a second substrate according to a twenty-third exemplary embodiment of the present invention. In FIG. 38, the same reference numerals denote the same elements in FIGS. 36 and 37, and thus the detailed descriptions of the same elements will be omitted.

Referring to FIG. 38, a common electrode 220 comprising ITO or IZO is formed over a second transparent substrate 210. A light blocking layer 230b that comprises an organic material having a light transmittance or a light blocking rate substantially equal to that of a chromium Cr is formed over the common electrode 220. The light blocking layer 230b is patterned through a photolithography process to form a light blocking pattern 230 at a position between pixel areas PA and to form a light visual angle pattern 232 at a position corresponding to the pixel areas PA. The light blocking pattern 230 blocks the light incident through between the pixel areas PA and the light visual angle pattern 232 improves a visual angle of light incident into the pixel areas PA to widen the visual angle of an image.

When the first and second transparent substrates 110 and 210 are assembled with each other, the light blocking pattern 230 makes contact with an upper surface of the color filter spacer 140 formed on a first substrate 100 (refer to FIG. 5).

In this exemplary embodiment, the light blocking pattern 230 is formed on the common electrode 220, and disposed at a position between the pixel areas PA. The light visual angle pattern 232 is formed on the common electrode 220, and disposed at a position corresponding to the pixel areas PA. The light blocking pattern 230 makes contact with the upper surface of the color filter spacer 140, thereby uniformly maintaining a cell gap between the first and second substrates 100 and 200. Thus, an LCD apparatus may block the light incident through between the pixel areas PA. Also, the LCD apparatus may be manufactured through simplified and reduced processes because the LCD apparatus does not need a separate spacer for maintaining the cell gap. Moreover, since the light visual pattern 232 widens the visual angle of the light incident into the pixel areas PA, the LCD apparatus may improve display quality of the image.

Embodiment 24

Figure 39:
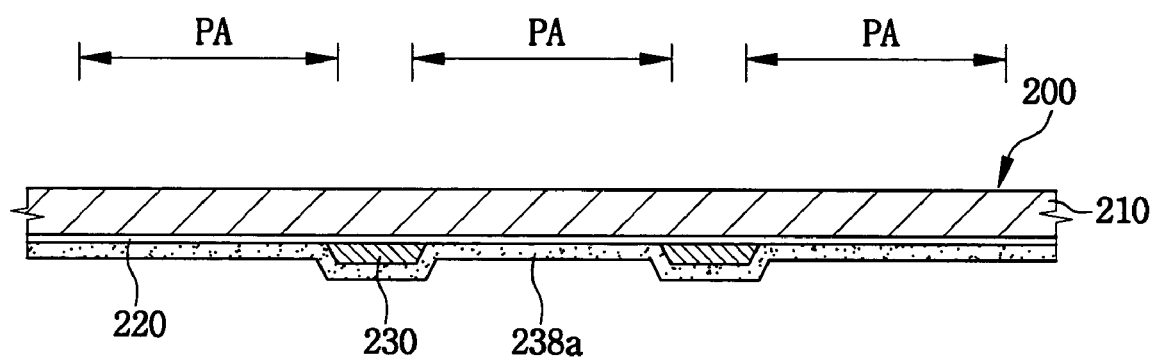
FIGS. 39 and 40 are cross-sectional views showing a second substrate according to a twenty-fourth exemplary embodiment of the present invention.
Figure 40:
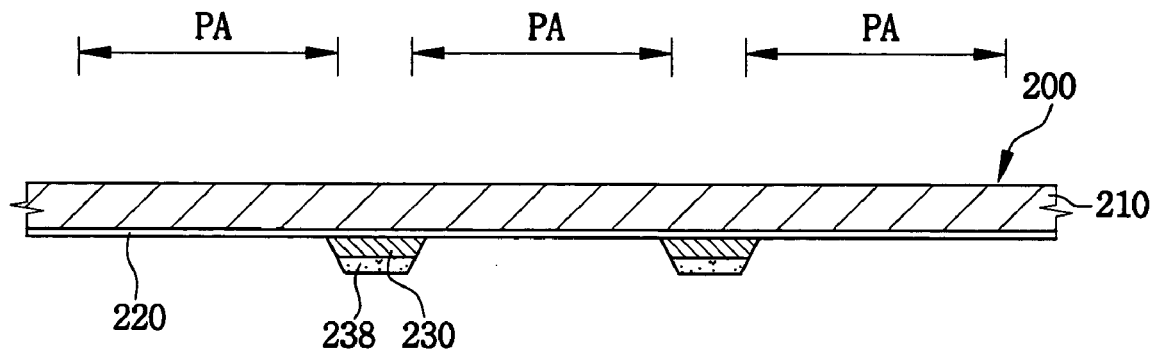

FIGS. 39 and 40 are cross-sectional views showing a second substrate according to a twenty-fourth exemplary embodiment of the present invention. In FIGS. 39 and 40, the same reference numerals denote the same elements in FIGS. 28 and 29, and thus the detailed descriptions of the same elements will be omitted.

Referring to FIG. 39, a common electrode 220 having ITO or IZO is formed over the second transparent substrate 210 of a second substrate 200. A light blocking layer is formed over common electrode 220, and then the light blocking layer is patterned to form a light blocking pattern 230 on the common electrode 220 that is formed on the second transparent substrate 210.

A transparent organic layer 238a is formed over common electrode 220 on which the light blocking pattern 230 is formed.

Referring to FIG. 40, the transparent organic layer 238a is patterned through a photolithography process to form a transparent spacer 238 on the light blocking pattern 230. The transparent spacer 238 is formed at position facing an upper surface of a color filter spacer 140 formed on a first substrate 100. When the first and second substrates 100 and 200 are assembled with each other, the transparent spacer 238 makes contact with the upper surface of the color filter spacer 140 to uniformly maintain a cell gap between the first and second substrates 100 and 200.

In this exemplary embodiment, the cell gap between the first and second substrates 100 and 200 may be uniformly maintained by means of the common electrode 220, light blocking pattern 230 and transparent spacer 238 sequentially formed on the second transparent substrate 210 with the color filter spacer 140 that is formed on the first transparent substrate 110. Thus, an LCD apparatus does not need a separate spacer, thereby simplifying and reducing the processes, for example, such as forming a photoresist layer, patterning the photoresist layer and cleaning the patterned photoresist layer, for the LCD apparatus. Also, the LCD apparatus may provide an improved display quality because the light blocking pattern 230 may block the light incident through between the pixel areas PA.

Embodiment 25

Figure 41:
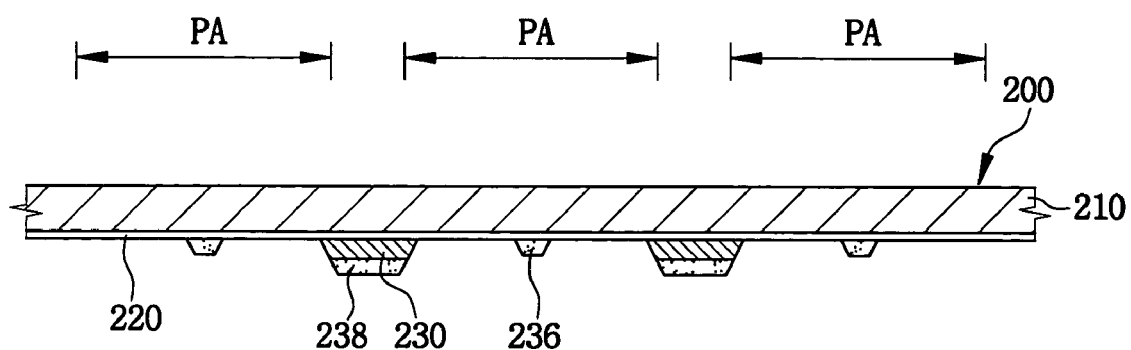
FIG. 41 is cross-sectional view showing a second substrate according to a twenty-fifth exemplary embodiment of the present invention.

FIG. 41 is cross-sectional view showing a second substrate according to a twenty-fifth exemplary embodiment of the present invention. In FIG. 41, the same reference numerals denote the same elements in FIGS. 39 and 40, and thus the detailed descriptions of the same elements will be omitted.

Referring to FIG. 41, when a transparent organic layer formed on a second transparent substrate 210 on which a common electrode 220 and a light blocking pattern 230 are formed, a transparent spacer 238 is formed on the light blocking pattern 230 formed at position between pixel areas PA, and a light visual angle pattern 236 is formed at a position corresponding to the pixel areas PA. The light visual angle pattern 236 improves properties of light incident into the pixel areas PA to widen a visual angle of an image. In this exemplary embodiment, in order to widen the visual angle of the image without decrease of brightness, liquid crystal having liquid crystal molecules vertically aligned is disposed between the first and second substrates 100 and 200.

In this exemplary embodiment, a common electrode 220 is formed on the second transparent substrate 210. The light blocking pattern 230 and transparent spacer 238 are formed at the position between the pixel areas PA, and the light visual angle pattern 236 is formed at the position corresponding to the pixel areas PA.

The transparent spacer 238 may uniformly maintain a cell gap between the first and second transparent substrates 110 and 210 with a color filter spacer 140 formed on the first transparent substrate 110. Thus, an LCD apparatus does not need a separate spacer, thereby simplifying and reducing the processes, for example, such as forming a photoresist layer, patterning the photoresist layer and cleaning the patterned photoresist layer, for the LCD apparatus. Also, the LCD apparatus may provide an improved display quality because the light blocking pattern 230 may block the light incident through between the pixel areas PA.

Embodiment 26

Figure 42:
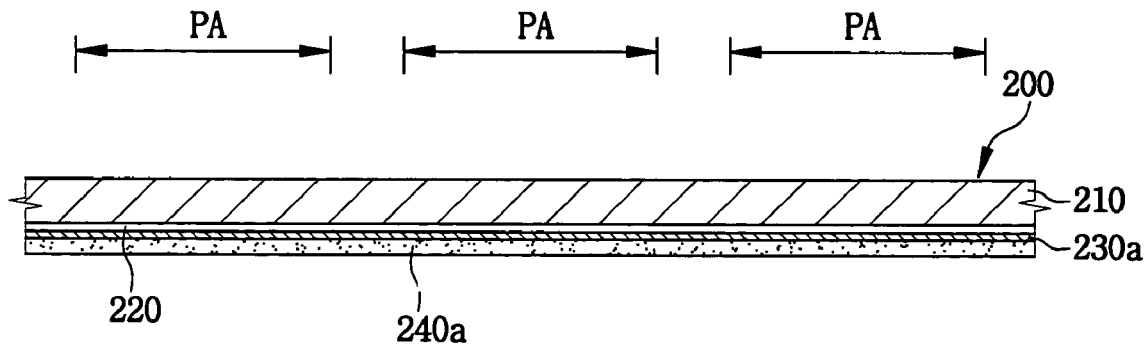
FIGS. 42 to 44 are cross-sectional views showing a second substrate according to a twenty-sixth exemplary embodiment of the present invention.
Figure 43:
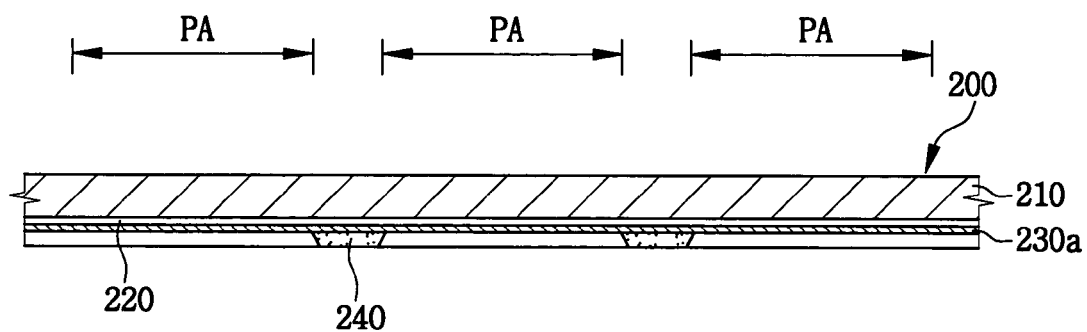
Figure 44:
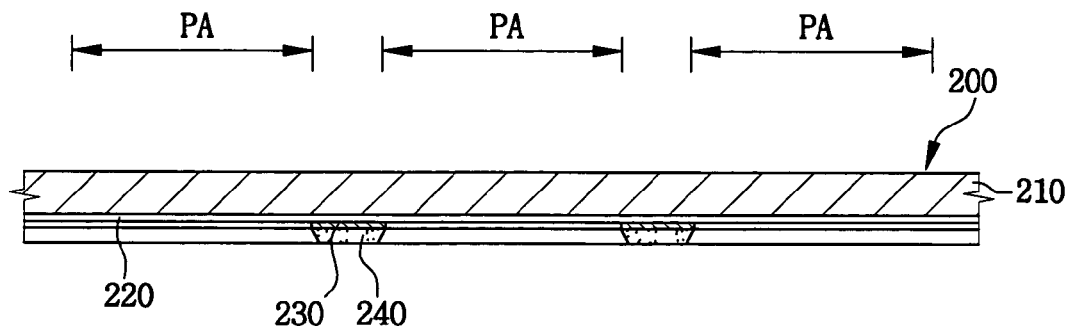

FIGS. 42 to 44 are cross-sectional views showing a second substrate according to a twenty-sixth exemplary embodiment of the present invention. In FIGS. 42 to 44, the same reference numerals denote the same elements in FIG. 11, and thus the detailed descriptions of the same elements will be omitted.

Referring to FIG. 42, a common electrode 220 comprising ITO or IZO is formed over a second transparent substrate 210 of a second substrate 200. A light blocking layer 230a comprising chromium Cr or a double-layer light blocking layer comprising chromium Cr and chromium oxide $CrO_2$ is formed on the common electrode 220. In this exemplary embodiment, the light blocking layer 230a comprises the chromium Cr.

A photosensitive layer 240a comprising a photosensitive material is formed over the light blocking layer 230a. The photosensitive layer 240a is patterned to form a photosensitive pattern 240 at a position between pixel areas PA.

When the light blocking layer 230a is patterned using the photosensitive pattern 240 as a mask, a light blocking pattern 230 is formed under the photosensitive patent 240.

In this exemplary embodiment, the light blocking pattern 230 and photosensitive pattern 240 are successively formed on the common electrode 220 and disposed between the pixel areas PA. When a first transparent substrate 110 is combined with the second transparent substrate 210, the photosensitive pattern 240 makes contact with a color filter spacer 140 formed on the first transparent substrate 110, thereby uniformly maintaining a cell gap between the first and second substrates 100 and 200.

Embodiment 27

Figure 45:
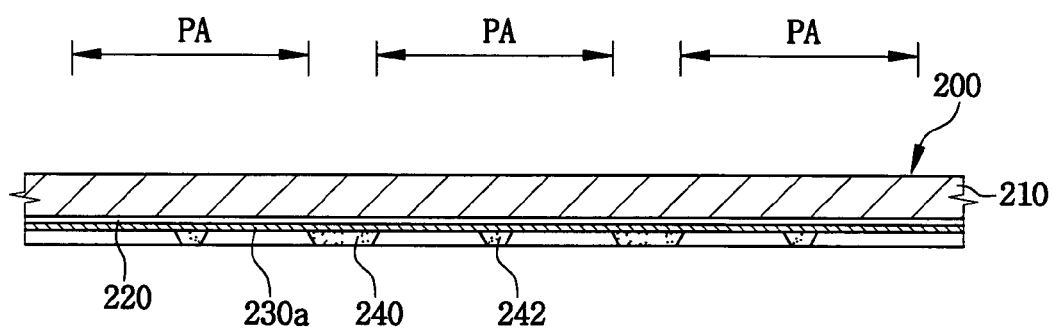
FIGS. 45 and 46 are cross-sectional views showing a second substrate according to a twenty-seventh exemplary embodiment of the present invention.
Figure 46:
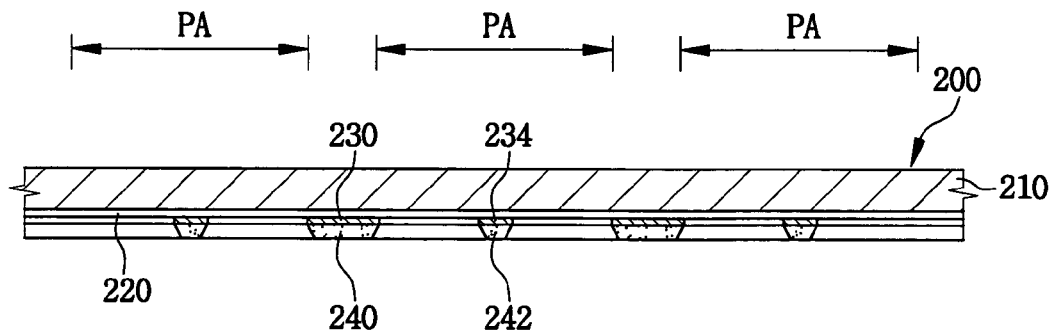

FIGS. 45 and 46 are cross-sectional views showing a second substrate according to a twenty-seventh exemplary embodiment of the present invention. In FIGS. 45 and 46, the same reference numerals denote the same elements in FIGS. 42 to 44, and thus the detailed descriptions of the same elements will be omitted.

Referring to FIG. 45, a common electrode 220 comprising ITO or IZO is formed over a second transparent substrate 210 of a second substrate 200. A light blocking layer 230a comprising chromium Cr or a double-layer light blocking layer comprising chromium Cr and chromium oxide $CrO_2$ is formed on the common electrode 220. In this exemplary embodiment, the light blocking layer 230a comprises the chromium Cr.

A photosensitive layer 240a comprising a photosensitive material is formed over the light blocking layer 230a. The photosensitive layer 240a is patterned to form a first light visual angle pattern 242 having a line shape at a position corresponding to pixel areas PA and to form a photosensitive pattern 240 at a position between the pixel areas PA.

When the light blocking layer 230a is patterned using the photosensitive pattern 240 and first light visual angle pattern 242 as a mask, a second light visual angle pattern 234 and a light blocking pattern 230 are formed under the first light visual angle pattern 242 and photosensitive patent 240, respectively.

In this exemplary embodiment, the light blocking pattern 230 and photosensitive pattern 240 are successively formed on the position between the pixel areas PA. When a first transparent substrate 110 is combined with the second transparent substrate 210, the photosensitive pattern 240 makes contact with a color filter spacer 140 formed on the first transparent substrate 110, thereby uniformly maintaining a cell gap between the first and second substrates 100 and 200. Also, the second and first light visual angle patterns 234 and 242 are successively formed on the position corresponding to the pixel areas PA. The first and second light visual angle patterns 242 and 234 improve properties of light incident into the pixel areas PA to widen a visual angle of an image.

In those exemplary embodiments aforementioned above, the color filter and color filter spacer formed on the first substrate on which the pixel electrode is formed has been described. However, the color filter and color filter spacer may be formed on the second substrate facing the first substrate on which the pixel electrode is formed. Also, the TFT manufactured using 4 masks has been described, but the TFT may be manufactured using 5 masks.

According to the LCD apparatus and method of manufacturing the same, a spacer for maintaining a cell gap between first and second substrates may be substantially and simultaneously formed with a color filter that is formed on a first substrate on which a pixel electrode is formed. Thus, the LCD apparatus may be manufactured through simplified and reduced processes.

Also, the second substrate includes a light visual angle pattern substantially and simultaneously formed with a light blocking pattern formed thereon, thereby improving display quality of an image.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A liquid crystal display apparatus, comprising:
   a first panel including:
      a first transparent substrate having a pixel area;
      a thin film transistor disposed at the pixel area so as to output a pixel voltage;
      a first color filter disposed at the pixel area, the first color filter having a first edge;
      a second color filter disposed adjacent to the first color filter and having a second edge, the first edge and the second edge being overlapped to provide an overlapped area between the first color filter and the second color filter;
      a spacer disposed on the overlapped area between the first color filter and the adjacent second color filter, the spacer having a same material as one of the first color filter and the second color filter; and
      a pixel electrode disposed on the first color filter so as to receive the pixel voltage;
   a second panel including:
      a second transparent substrate;
      a light blocking pattern formed on the second transparent substrate;
      a common electrode disposed on the second transparent substrate having the light blocking pattern formed thereon, a protruding portion of the common electrode protruded by the light blocking pattern making contact with an end portion of the spacer;
      a light visual angle pattern disposed on the common electrode and formed at a position corresponding to the pixel area so as to widen a visual angle of an image displayed by the liquid crystal display apparatus, the light visual angle pattern including a same material as the light blocking pattern; and
   a liquid crystal layer disposed between the first and second panels, wherein an opening is formed through each of the first color filter and the second color filter to partially expose the thin film transistor, and the pixel electrode is electrically connected to the thin film transistor through the opening,
   wherein the light visual angle pattern is disposed between the common electrode and the liquid crystal layer.

2. The liquid crystal display apparatus of claim 1, wherein a first color filter comprises a red color filter, a green color filter and a blue color filter, and the spacer comprises at least one of a red color filter, a green color filter and a blue color filter.

3. The liquid crystal display apparatus of claim 1, wherein the light blocking pattern has a lattice-shape that transmits light incident into the pixel area and blocks light incident into between the pixel area and an adjacent pixel area.

4. The liquid crystal display apparatus of claim 3, wherein the liquid crystal layer comprises liquid crystal molecules vertically aligned.

5. The liquid crystal display apparatus of claim 1, wherein the light blocking pattern has a lattice-shape, which is disposed between the second transparent substrate and common electrode and formed at a position corresponding to a space between the pixel area and adjacent pixel area, so as to block light incident into between the pixel area and an adjacent pixel area.

6. The liquid crystal display apparatus of claim 5, wherein the liquid crystal layer comprises liquid crystal molecules vertically aligned.

7. The liquid crystal display apparatus of claim 1,
   wherein the second panel further comprises:
   the light blocking pattern having a lattice-shape, which is formed at a position corresponding to a space between the pixel area and adjacent pixel area, so as to block light incident into between the pixel area and an adjacent pixel area; and
   a photosensitive pattern disposed on the light blocking pattern.

8. The liquid crystal display apparatus of claim 7, wherein the liquid crystal layer comprises liquid crystal molecules vertically aligned, and the second panel further comprises a first light visual angle pattern disposed on the common electrode and formed at a position corresponding to the pixel area so as to widen a visual angle of an image; and
   a second light visual angle pattern disposed on the first light visual angle pattern.

9. The liquid crystal display apparatus of claim 1,
   wherein the second panel further comprises:
   the light blocking pattern having a lattice-shape, which is disposed between the second transparent substrate and common electrode and formed at a position corresponding to a space between the pixel area and an adjacent pixel area, the light blocking pattern that transmits light incident into the pixel area and blocks light incident into between the pixel area and the adjacent pixel area; and
   a photosensitive pattern disposed on the light blocking pattern.

10. The liquid crystal display apparatus of claim 9, wherein the liquid crystal layer comprises liquid crystal molecules vertically aligned, and the second panel further comprises a first light visual angle pattern disposed between the first transparent substrate and common electrode and fanned at a position corresponding to the pixel area so as to widen a visual angle of an image and a second light visual angle pattern disposed on the first light visual angle pattern.

11. The liquid crystal display apparatus of claim 1, wherein the second panel further comprises a transparent spacer disposed on the common electrode corresponding to the light blocking pattern.

12. The liquid crystal display apparatus of claim 1, wherein the liquid crystal layer comprises liquid crystal molecules vertically aligned, and the second panel further comprises a light visual angle pattern disposed between the common electrode and second transparent substrate and formed at a position corresponding to the pixel area so as to widen a visual angle of an image.

13. The liquid crystal display apparatus of claim 1, wherein the spacer has a column shape, the spacer being configured to maintain a cell gap between the first substrate and the second substrate.

14. The liquid crystal display apparatus of claim 1, wherein the common electrode makes direct contact with the spacer.

* * * * *